United States Patent [19]

Abe et al.

[11] Patent Number: 5,559,199
[45] Date of Patent: Sep. 24, 1996

[54] PROCESS FOR PRODUCTION OF ETHYLENE-CYCLIC OLEFIN COPOLYMER

[75] Inventors: Yoshiharu Abe; Toshihiro Sagane; Akinori Toyota, all of Yamaguchi-ken, Japan

[73] Assignees: Mitsui Petrochemical Industries, Ltd., Tokyo, Japan; Hoechst Aktiengesellschaft, Frankfurt, Germany

[21] Appl. No.: 426,252

[22] Filed: Apr. 21, 1995

[30] Foreign Application Priority Data

Apr. 22, 1994 [JP] Japan ................... 6-084725

[51] Int. Cl.$^6$ ............... C08F 2/38; C08F 210/02
[52] U.S. Cl. ............... 526/160; 526/82; 526/126; 526/127; 526/132; 526/134; 526/153; 526/170; 526/281; 526/282; 526/308; 526/903; 526/943
[58] Field of Search ............... 526/82, 126, 127, 526/132, 134, 160, 281, 308, 170, 161, 282, 903, 943, 153

[56] References Cited

U.S. PATENT DOCUMENTS

| | | |
|---|---|---|
| 4,614,778 | 9/1986 | Kajiura et al. |
| 5,003,019 | 3/1991 | Ishimaru et al. |
| 5,008,359 | 4/1991 | Hunter. |
| 5,087,677 | 2/1992 | Brekner et al. ............ 526/160 |
| 5,179,171 | 1/1993 | Minami et al. |
| 5,225,503 | 7/1993 | Sagane et al. ............ 526/281 X |
| 5,272,235 | 12/1993 | Wakatsuru et al. ............ 526/281 |

FOREIGN PATENT DOCUMENTS

| | | |
|---|---|---|
| 0358516 | 3/1990 | European Pat. Off. |
| 0504418 | 9/1992 | European Pat. Off. |
| 0503422 | 9/1992 | European Pat. Off. |
| 0501370 | 9/1992 | European Pat. Off. |
| 0542488 | 5/1993 | European Pat. Off. |
| 0610851 | 8/1994 | European Pat. Off. |
| 61-98780 | 5/1986 | Japan. |
| 61-115916 | 6/1986 | Japan. |
| 61-120816 | 6/1986 | Japan. |
| 61-221206 | 10/1986 | Japan. |
| 2-173112 | 7/1990 | Japan. |
| 2173112 | 7/1990 | Japan. |
| 3-234716 | 10/1991 | Japan. |
| 5320258 | 12/1993 | Japan. |

OTHER PUBLICATIONS

Hawley's Condensed Chem. Dict. (12th ed.) van Nostrand Reinhold, N.Y., 349 1993).

*Primary Examiner*—Fred Teskin
*Attorney, Agent, or Firm*—Birch, Stewart, Kolasch & Birch, LLP

[57] ABSTRACT

There is provided a process for producing a cyclic olefin copolymer by copolymerizing (A) ethylene and (B) a particular cyclic olefin in the presence of (C) a metallocene catalyst and (D) a small amount of an α-olefin having 3 to 20 carbon atoms. According to the said process, said copolymer can be produced at a high activity and its molecular weight can be controlled in a wide range. The copolymer produced by the said process has excellent properties inherent to the cyclic olefin copolymer.

5 Claims, No Drawings

PROCESS FOR PRODUCTION OF ETHYLENE-CYCLIC OLEFIN COPOLYMER

BACKGROUND OF THE INVENTION

(1) Field of the Invention

The present invention relates to a process for producing a cyclic olefin copolymer, and to a copolymer produced by the said process. More particularly, the present invention relates to a process for producing a cyclic olefin copolymer having a molecular weight controlled in a wide range at a high catalytic activity, and to a copolymer produced by the said process.

(2) Prior Art

Heretofore, it has been well known that cyclic olefin random copolymers obtained by copolymerizing ethylene with a cyclic olefin such as tetracyclododecene or norbornene are synthetic resins which are excellent in transparency, whose heat resistance, heat aging resistance, chemical resistance, solvent resistance, dielectric properties and rigidity are well balance, and which exhibit excellent performance in the field of optical materials such as optical memory disks and optical fibers. These copolymers have been proposed in JP-A-60-168708 (the term "JP-A" as used herein means an "unexamined published Japanese patent application"), JP-A-61-98780, JP-A-61-115912, JP-A-61-115916, JP-A-61-120816 and JP-A-62-252407. It is also known that the cyclic olefin random copolymers disclosed in these prior arts exhibit excellent performance in the field of structural materials.

In JP-A-61-221206, JP-A-64-106, JP-A-2-173112, JP-A-3-234716 and JP-A-5-320258 are disclosed processes for producing cyclic olefin copolymers at high activities using particular transition metal compounds. In these processes, the control of molecular weight can be made possible by the addition of hydrogen or the control of polymerization temperature; however, when hydrogen or the like is added for the purpose of controlling molecular weight, there has arisen reduction in catalytic activity, in some cases.

SUMMARY OF THE INVENTION

An object of the present invention is to provide a process for producing a cyclic olefin copolymer, which can maintain a high catalytic activity, and which can control the molecular weight of the obtained copolymer in a wide range.

Other object of the present invention is to provide a cyclic olefin copolymer produced by the above process.

The present inventors made a diligent study on a process for economically producing a cyclic olefin copolymer of desired molecular weight. As a result, the present inventors have found that, surprisingly, the molecular weight of a cyclic olefin copolymer can be controlled in a wide range, while a high catalytic activity can be maintained, by conducting copolymerization in the presence of a particular α-olefin. The finding has led to the completion of the present invention.

According to the present invention, there is provided a process for producing a cyclic olefin copolymer, which comprises copolymerizing (A) ethylene, and (B) at least one cyclic olefin selected from the group consisting of
 a compound represented by the following formula [I]

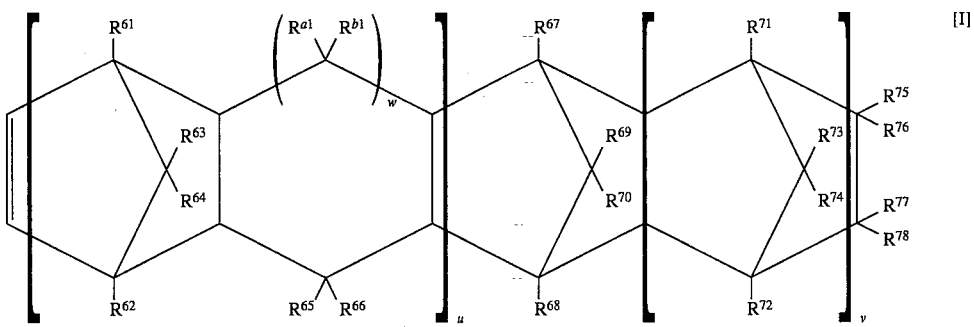

(wherein u is 0 or 1; v is 0 or a positive integer; w is 0 or 1; $R^{61}$ to $R^{78}$, $R^{a1}$ and $R^{b1}$ are independently selected from the group consisting of a hydrogen atom, a halogen atom and a hydrocarbon group; $R^{75}$ to $R^{78}$ may be bonded together to form a single ring or multiple rings; the single ring or the multiple rings may have a double bond; and $R^{75}$ and $R^{76}$, or $R^{77}$ and $R^{78}$ may form an alkylidene group),
 a compound represented by the following formula [II]

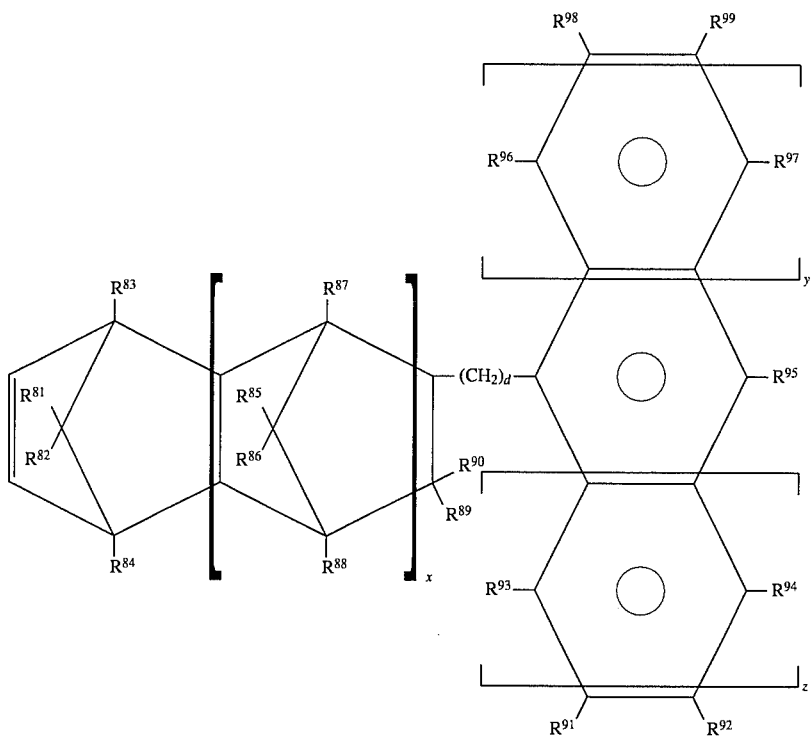

(wherein x and d are 0 or an integer of 1 or more; y and z are each 0, 1 or 2; $R^{81}$ to $R^{99}$ are independently selected from the group consisting of a hydrogen atom, a halogen atom, an aliphatic hydrocarbon group, an alicyclic hydrocarbon group, an aromatic hydrocarbon group and an alkoxy group; the carbon atom to which $R^{89}$ and $R^{90}$ are bonded and the carbon to which $R^{93}$ is bonded or the carbon atom to which $R^{91}$ is bonded may be bonded together directly or via an alkylene group having 1 to 3 carbon atoms; and $R^{95}$ and $R^{92}$, or $R^{95}$ and $R^{99}$ may be bonded together to form a single aromatic ring or multiple aromatic rings when y=z=0), and a compound represented by the following formula [III]

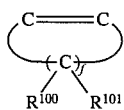

(wherein $R^{100}$ and $R^{101}$ are independently a hydrogen atom or a hydrocarbon group having 1 to 5 carbon atoms, and f is an integer of 1 to 18), in the presence of (C) a catalyst comprising (C$_1$) a transition metal compound represented by the following formula [IV]

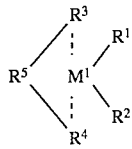

[wherein $M^1$ is titanium, zirconium, hafnium, vanadium, niobium or tantalum; $R^1$ and $R^2$ are independently selected from the group consisting of a hydrogen atom, a halogen atom, an alkyl group having 1 to 10 carbon atoms, an alkoxy group having 1 to 10 carbon atoms, an aryl group having 6 to 10 carbon atoms, an aryloxy group having 6 to 10 carbon atoms, an alkenyl group having 2 to 10 carbon atoms, an arylalkyl group having 7 to 40 carbon atoms, an alkylaryl group having 7 to 40 carbon atoms or an arylalkenyl group having 8 to 40 carbon atoms; $R^3$ and $R^4$ are independently a hydrocarbon group of a single ring or multiple rings, having a cyclopentadienyl skeleton capable of coordinating to the central metal $M^1$; and $R^5$ is

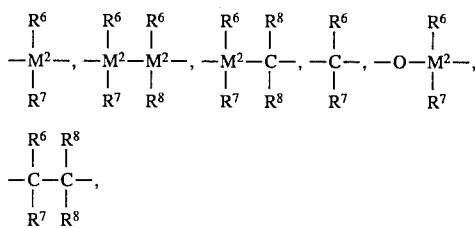

$=BR^6$, $=AlR^6$, —Ge—, —Sn—, —O—, —S—, $=SO$, $=SO_2$, $=NR^6$, $=CO$, $=PR^6$ or $=P(O)R^6$, wherein $R^6$, $R^7$ and $R^8$ are independently a hydrogen atom, a halogen atom, an alkyl group having 1 to 10 carbon atoms, a fluoroalkyl group having 1 to 10 carbon atoms, a fluoroaryl group having 6 to 10 carbon atoms, an aryl group having 6 to 10 carbon atoms, an alkoxy group having 1 to 10 carbon atoms, an alkenyl group having 2 to 10 carbon atoms, an arylalkyl group having 7 to 40 carbon atoms, an alkylaryl group having 7 to 40 carbon atoms or an arylalkenyl group having 8 to 40 carbon atoms, or $R^6$ and $R^7$ may be bonded to each other to form a ring together with the atom to which they bond, and $R^6$ and $R^8$ may also be bonded to each other to form a ring together with the atom to which they bond, and $M^2$ is silicon, germanium or tin], and (C$_2$) at least one member selected from the group consisting of an organic aluminum oxy compound, a compound capable of reacting with said transition metal compound (C$_1$) to form an ionic complex, and a combination of at least one of these two compounds and an organic aluminum compound, and in the presence of (D) an α-olefin having 3 to 20 carbon atoms, the α-olefin (D) having 3 to 20 carbon atoms being used in a molar ratio of α-olefin (D) to ethylene (A), of 0.0005 to 0.2.

According to the present invention, there is further provided a cyclic olefin copolymer produced by the above process, having a glass transition temperature Tg, as measured by DSC, of 0° to 250° C., an intrinsic viscosity [η], as measured at 135° C. in DECALIN (decahydronapthalene), of 0.05 to 1.5 dl/g, an iodine value of 1.5 g to $I_2$/100 g polymer or less, and a content of $C_3$–$C_{20}$ α-olefin unit, of 7 mole % or less.

The above objects and advantages of the present invention can be achieved by the above process and copolymer.

The present invention is hereinafter described in detail, whereby the other objects and advantages of the present invention will become apparent.

DETAILED DESCRIPTION OF THE INVENTION

First, description is made on the compounds represented by the formulas [I], [II] and [III] used in production of cyclic olefin random copolymer.

In the formula [I], u is 0 or 1; v is 0 or a positive integer, preferably 0 or a positive integer of 1 to 3; and w is 0 or 1.

$R^{61}$ to $R^{78}$, $R^{a1}$ and $R^{b1}$ are independently a hydrogen atom, a halogen atom or a hydrocarbon group.

The halogen atom is a fluorine atom, a chlorine atom, a bromine atom or an iodine atom.

The hydrocarbon group is generally selected from, for example, an alkyl group having 1 to 20 carbon atoms, a halogenated alkyl group having 1 to 20 carbon atoms, a cycloalkyl group having 3 to 15 carbon atoms, or an aromatic hydrocarbon group.

Specific examples of the alkyl group are a methyl group, an ethyl group, a propyl group, an isopropyl group, an amyl group, a hexyl group, an octyl group, a decyl group, a dodecyl group, an octadecyl group, etc. These alkyl groups may be halogen-substituted.

A specific example of the cycloalkyl group is a cyclohexyl group; and specific examples of the aromatic hydrocarbon group are a phenyl group and a naphthyl group.

In the formula [I], $R^{75}$ and $R^{76}$, $R^{77}$ and $R^{78}$, $R^{75}$ and $R^{77}$, $R^{76}$ and $R^{78}$, $R^{75}$ and $R^{78}$, or $R^{76}$ and $R^{77}$ may be bonded together to form a single ring or multiple rings; and the single ring or multiple rings may have a double bond. Specific examples of the single ring and the multiple rings include the followings.

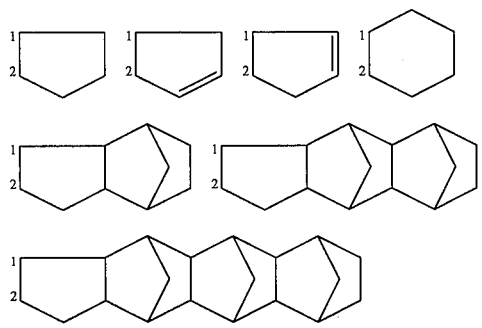

In the above examples, the carbon atom denoted at numeral 1 or 2 represents a carbon atom to which $R^{75}$ ($R^{76}$) or $R^{77}$ ($R^{78}$) is bonded in the formula [I]. $R^{75}$ and $R^{76}$, or $R^{77}$ and $R^{78}$ may form an alkylidene group. This alkylidene group generally has 2 to 20 carbon atoms, with illustrative examples thereof including an ethylidene group, a propylidene group and an isopropylidene group.

In the formula [II], x and d are 0 or a positive integer; and y and z are 0, 1 or 2.

$R^{81}$ to $R^{99}$ are independently a hydrogen atom, a halogen atom, an aliphatic hydrocarbon group, an aromatic hydrocarbon group or an alkoxy group.

Specific examples of the halogen atom are the same as those provided for the halogen atom of the above formula [I]. Illustrative examples of the aliphatic hydrocarbon group include an alkyl group having 1 to 20 carbon atoms and a cycloalkyl group having 3 to 15 carbon atoms. Specific examples of the alkyl group include a methyl, ethyl, propyl, isopropyl, amyl, hexyl, octyl, decyl, dodecyl and octadecyl group. These alkyl groups may be substituted with a halogen atom. Examples of the cycloalkyl group include a cyclohexyl group.

Examples of the aromatic hydrocarbon group include an aryl group and an aralkyl group, and the preferred are those having 6 to 10 carbon atoms. Specific examples are a phenyl, tolyl, naphthyl, benzyl and phenylethyl.

Preferred examples of the alkoxy group are those having 1 to 3 carbon atoms such as a methoxy group, an ethoxy group and a propoxy group.

The carbon atom to which $R^{89}$ and $R^{90}$ are bonded and the carbon atom to which $R^{93}$ is bonded or the carbon atom to which $R^{91}$ is bonded may be bonded together directly or via an alkylene group having 1 to 3 carbon atoms. That is, when the two carbon atoms are bonded together via an alkylene group, $R^{89}$ and $R^{93}$ or $R^{90}$ and $R^{91}$ together form an alkylene group of a methylene group (—$CH_2$—), ethylene group (—$CH_2CH_2$—) or propylene group (—$CH_2CH_2CH_2$—).

Further, when y=z=0, $R^{95}$ and $R^{92}$, or $R^{95}$ and $R^{99}$, may be bonded together to form a single aromatic ring or multiple aromatic rings. Specifically, when y=z=0, the following aromatic rings may be formed by $R^{95}$ and $R^{92}$:

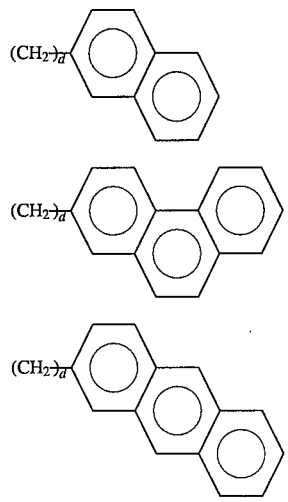

wherein d is the same as in the above formula [II].

In the formula [III], $R^{100}$ and $R^{101}$ are independently a hydrogen atom or a hydrocarbon group having 1 to 5 carbon atoms, and f is $1 \leq f \leq 18$.

The hydrocarbon group having 1 to 5 carbon atoms is preferably an alkyl group, a halogenated alkyl group or a cycloalkyl group. Specific examples of these groups can be the same as those mentioned for $R^{61}$ to $R^{78}$.

Illustrative examples of the cyclic olefin represented by the above formula [I], [II] or [III] include bicyclo-2-heptene derivatives (bicyclohepto-2-en derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-4-hexadecene derivatives, pentacyclo-3-hexadecene derivatives, hexacyclo-4-heptadecene derivatives, heptacyclo-5-eicosene derivatives, heptacyclo-4-eicosone derivatives, heptacyclo-5-heneicosene derivatives, octacyclo-5-docosene derivatives, nonacyclo-5-pentacosene derivatives, nonacyclo-6-hexacosene derivatives, cycloentadiene-acenaphthylene adduct, 1,4- methano-1,4,4a,9a-tetrahydrofluorene derivatives, 1,4- methano-1,4,4a,5,10,10a-hexahydroanthracene derivatives and cycloalkylene derivatives having 8 to 20 carbon atoms.

Specific examples of the cyclic olefin represented by the above formula [I], [II] or [III] are shown below.
Bicyclo[2.2.1]hepto-2-en derivatives such as
(401) bicyclo[2.2.1]hepto-2-en

(402) 6-methlbicyclo[2.2.1]hepto-2-en

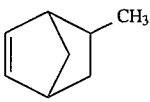

(403) 5,6-dimethylbicyclo[2.2.1]hepto-2-en

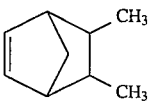

(404) 1-methylbicyclo[2.2.1]hepto-2-en

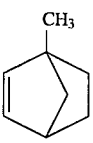

(405) 6-ethylbicyclo[2.2.1]hepto-2-en

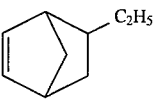

(406) 6-n-butylbicyclo[2.2.1]hepto-2-en

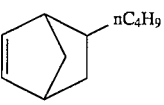

(407) 6-isobutylbicyclo[2.2.1]hepto-2-en

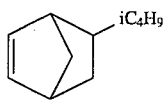

(408) 7-methylbicyclo[2.2.1]hepto-2-en;

tricyclo[4.3.0.1$^{2,5}$]-3-decene derivatives such as (409) tricyclo[4.3.0.1$^{2,5}$]-3-decene

(410) 2-methyltricyclo[4.3.0.1$^{2,5}$]-3-decene

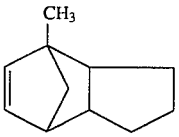

(411) 5-methyltricyclo [4.3.0.1$^{2,5}$]-3-decene;

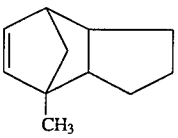

tricyclo[4.4.0.1$^{2,5}$]-3-undecene derivatives such as (412) tricyclo[4.4.0.1$^{2,5}$]-3-undecene

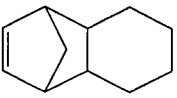

(413) 10-methyltricyclo[4.4.0.1$^{2,5}$]-3-undecene;

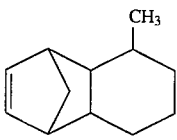

tetracyclo[4.4.0.1$^{2,5}$.1$^{7,10}$]-3-dodecene derivatives such as (414) tetracyclo[4.4.0.1$^{2,5}$.1$^{7,10}$]-3-dodecene

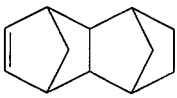

(415) 8-methyltetracyclo[4.4.0.1$^{2,5}$. 1$^{7,10}$]-3-dodecene

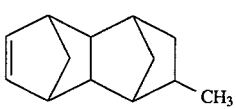

(416) 8-ethyltetracyclo[4.4.0.1$^{2,5}$.1$^{7,10}$]-3-dodecene

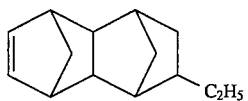

(417) 8-propyltetracyclo[4.4.0.1$^{2,5}$.1$^{7,10}$]-3-dodecene

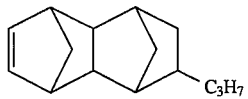

(418) 8-butyltetracyclo[4.4.0.1$^{2,5}$.1$^{7,10}$]-3-dodecene

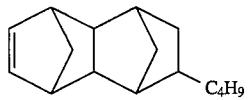

(419) 8-isobutyltetracyclo[4.4.0.1$^{2,5}$.1$^{7,10}$]-3-dodecene

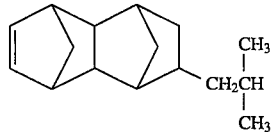

(420) 8-hexyltetracyclo[4.4.0.1$^{2,5}$.1$^{7,10}$]-3-dodecene

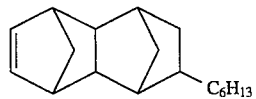

(421) 8-cyclohexyltetracyclo[4.4.0.1$^{2,5}$.1$^{7,10}$]-3-dodecene

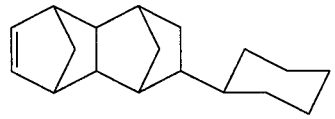

(422) 8-stearyltetracyclo [4.4.0.1$^{2,5}$.1$^{7,10}$]-3-dodecene

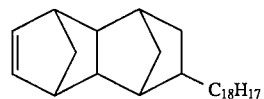

(423) 5,10-dimethyltetracyclo[4.4.0.1$^{2,5}$.1$^{7,10}$]-3-dodecene

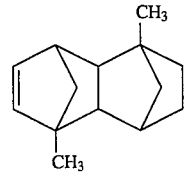

(424) 2,10-dimethyltetracyclo[4.4.0.1$^{2,5}$.1$^{7,10}$]-3-dodecene

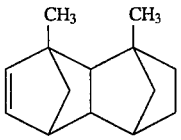

(425) 8,9-dimethyltetracyclo[4.4.0.1$^{2,5}$.1$^{7,10}$]-3-dodecene

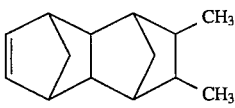

(426) 8-ethyl-9-methyltetracyclo[4.4.0.1$^{2,5}$.1$^{7,10}$]-3-dodecene

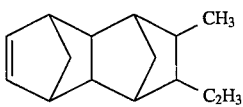

(427) 11,12-dimethyltetracyclo[4.4.0.1$^{2,5}$.1$^{7,10}$]-3-dodecene

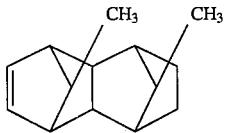

(428) 2,7,9-trimethyltetracyclo[4.4.0.1$^{2,5}$.1$^{7,10}$]-3-dodecene

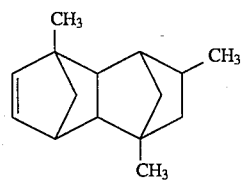

(429) 2,7-dimethyl-9-ethyltetracyclo[4.4.0.1$^{2,5}$.1$^{7,10}$]-3-dodecene

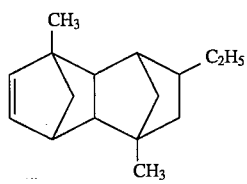

(430) 9-isobutyl-2,7-dimethyltetracyclo-[4.4.0.1$^{2,5}$.1$^{7,10}$]-3-dodecene

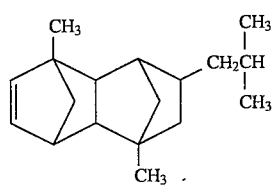

(431) 9,11,12-trimethyltetracyclo[4.4.0.1²,⁵.1⁷,¹⁰]-3-dodecene

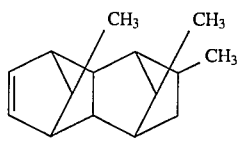

(432) 9-ethyl-11,12-dimethyltetracyclo-[4.4.0.1²,⁵.¹⁷,¹⁰]-3-dodecene

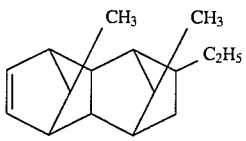

(433) 9-isobutyl-11,12-dimethyltetracyclo-[4.4.0.1²,⁵.1⁷,¹⁰]-3-dodecene

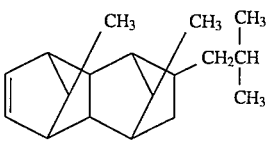

(434) 5,8,9,10-tetramethyltetracyclo[4.4.0.1²,⁵.1⁷,¹⁰]-3-dodecene

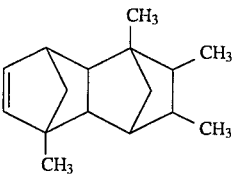

(435) 8-ethylidenetetracyclo[4.4.0.1²,⁵.1⁷,¹⁰]-3-dodecene

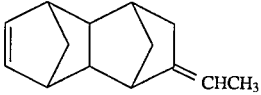

(436) 8-ethylidene-9-methyltetracyclo[4.4.0.1²,⁵.1⁷,¹⁰]-3-dodecene

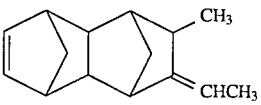

(437) 8-ethylidene-9-ethyltetracyclo[4.4.0.1²,⁵.1⁷,¹⁰]-3-dodecene

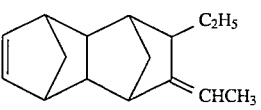

(438) 8-ethylidene-9-isopropyltetracyclo-[4.4.0.1²,⁵.1⁷,¹⁰]-3-dodecene

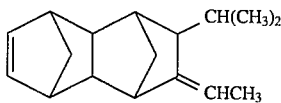

(439) 8-ethyliene-9-butyltetracyclo[4.4.0.1²,⁵.1⁷,¹⁰]-3-dodecene

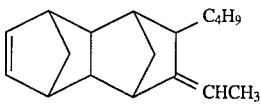

(440) 8-n-propylidenetetracyclo[4.4.0.1²,⁵.1⁷,¹⁰]-3-dodecene

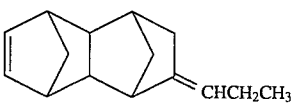

(441) 8-n-propyliene-9-methyltetracyclo[4.4.0.1²,⁵.1⁷,¹⁰]-3-dodecene

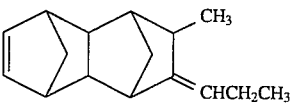

(442) 8-n-propylidene-9-ethyltetracyclo[4.4.0.1²,⁵.1⁷,¹⁰]-3-dodecene

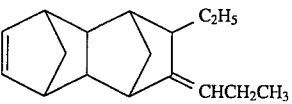

(443) 8-n-propylidene-9-isopropyltetracyclo[4.4.0.1²,⁵.1⁷,¹⁰]-3-dodecene

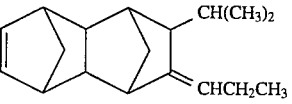

(444) 8-n-propylidene-9-butyltetracyclo[4.4.0.1²,⁵.1⁷,¹⁰]-3-dodecene

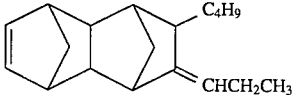

(445) 8-isopropylidenetetracyclo[4.4.0.1²,⁵.1⁷,¹⁰]-3-dodecene

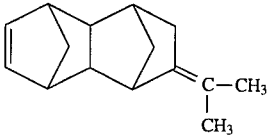

(446) 8-isopropylidene-9-methyltetracyclo[4.4.0.1^{2,5}.1^{7,10}]-3-dodecene

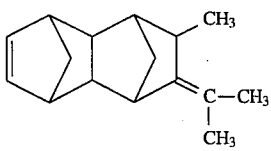

(447) 8-isopropylidene-9-ethyltetracyclo[4.4.0.1^{2,5}.1^{7,10}]-3-dodecene

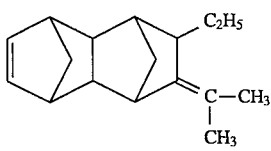

(448) 8-isopropylidene-9-isopropyltetracyclo[4.4.0.1^{2,5}.1^{7,10}]-3-dodecene

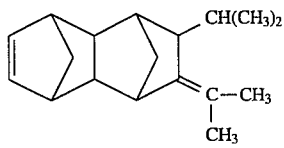

(449) 8-isopropylidene-9butyltetracyclo[4.4.0.1^{2,5}.1^{7,10}]-3-dodecene

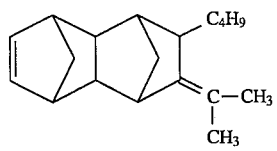

(450) 8-chlorotetracyclo[4.4.0.1^{2,5}.1^{7,10}]-3-dodecene

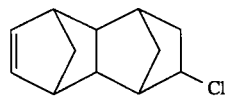

(451) 8-bromotetracyclo[4.4.0.1^{2,5}.1^{7,10}]-3-dodecene

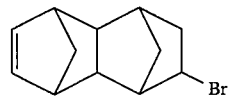

(452) 8-fluorotetracyclo[4.4.0.1^{2,5}.1^{7,10}]-3-dodecene

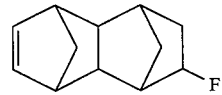

(453) 8,9-dichlorotetracyclo[4.4.0.1^{2,5}.1^{7,10}]-3-dodecene

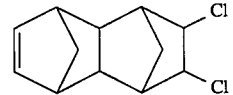

pentacyclo[6.5.1.1^{3,6}.0^{2,7}.0^{9,13}]-4-pentadecene derivatives such as (454) pentacyclo[6.5.1.1^{3,6}.0^{2,7}.0^{9,13}]-4-pentadecene

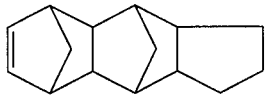

(455) 1,3-dimethylpentacyclo[6.5.1.1^{3,6}.0^{2,7}.0^{9,13}]-4-pentadecene

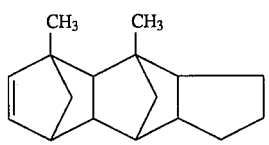

(456) 1,6-dimethylpentacyclo[6.5.1.1^{3,6}.0^{2,7}.0^{9,13}]-4-pentadecene

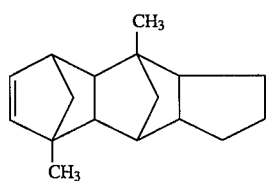

(457) 14,15-dimethylpentacyclo[6.5.1.1^{3,6}.0^{2,7}.0^{9,13}]-4-pentadecene;

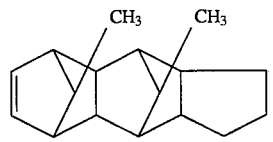

pentacyclo[7.4.0.1^{2,5}.1^{9,12}.0^{8,13}]-3-pentadecene derivatives such as
(458) pentacyclo[7.4.0.1^{2,5}.1^{9,12}.0^{8,13}]-3-pentadecene

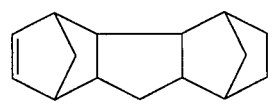

(459) methyl-substituted pentacyclo[7.4.0.1^{2,5}.1^{9,12}.0^{8,13}]-3-pentadecene;

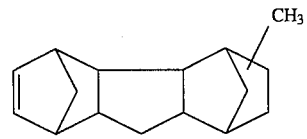

pentacyclopentadecadiene compounds such as
(460) pentacyclo[6.5.1.1^{3,6}.0^{9,13}]-4,10-pentadecadiene;

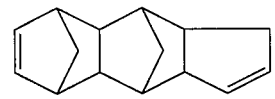

pentacyclo[8.4.0.1^{2,5}.1^{9,12}.0^{8,13}]-3-hexadecene derivatives such as (461) pentacyclo[8.4.0.1$^{2,5}$.1$^{9,12}$.0$^{8,13}$]-3-hexadecene

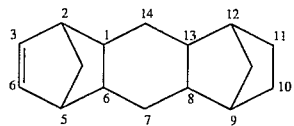

(462) 11-methyl-pentacyclo[8.4.0.1$^{2,5}$.1$^{9,12}$.0$^{8,13}$]-3-hexadecene

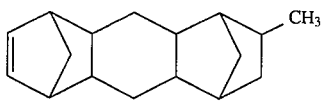

(463) 11-ethyl-pentacyclo[8.4.0.1$^{2,5}$.1$^{9,12}$.0$^{8,13}$]-3-hexadecene

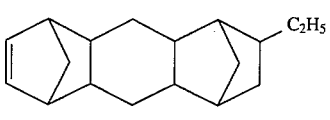

(464) 10,11-dimethyl-pentacyclo[8.4.0.1$^{2,5}$.1$^{9,12}$.0$^{8,13}$]-3-hexadecene;

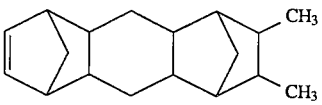

pentacyclo[6.6.1.1$^{3,6}$.0$^{2,7}$.0$^{9,14}$]-4-hexadecene derivatives such as
(465) pentacyclo[6.6.1.1$^{3,6}$.0$^{2,7}$.0$^{9,14}$]-4-hexadecene

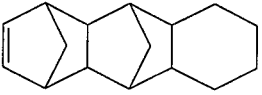

(466) 1,3-dimethylopentacyclo[6.6.1.1$^{3,6}$.0$^{2,7}$.0$^{9,14}$]-4-hexadecene

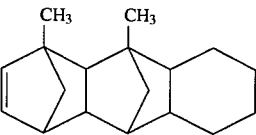

(467) 1,6-dimethylpentacyclo[6.6.1.1$^{3,6}$.0$^{2,7}$.0$^{9,14}$]-4-hexadecene

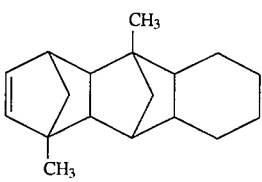

(468) 15,16-dimethylpentacyclo[6.6.1.1$^{3,6}$.0$^{2,7}$.0$^{9,14}$]-4-hexadecene

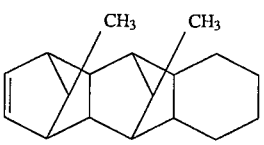

hexacyclo[6.6.1.1$^{3,6}$.1$^{10,13}$.0$^{2,7}$.0$^{9,14}$]-4-heptadecene derivatives such as
(469) hexacyclo[6.6.1.1$^{3,6}$.1$^{10,13}$.0$^{2,7}$.0$^{9,14}$]-4-heptadecene

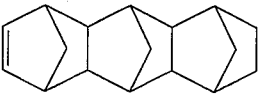

(470) 12-methylhexacyclo[6.6.1.1$^{3,6}$.1$^{10,13}$.0$^{2,7}$.0$^{9,14}$]-4-heptadecene

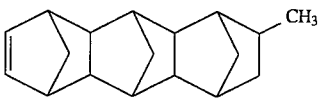

(471) 12-ethylhexacyclo[6.6.1.1$^{3,6}$.1$^{10,13}$.0$^{2,7}$.0$^{9,14}$]-4-heptadecene

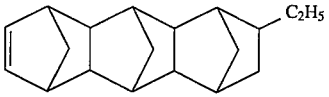

(472) 12-isobutylhexacyclo-[6.6.1.1$^{3,6}$.1$^{10,13}$.0$^{2,7}$.0$^{9,14}$]-4-heptadecene

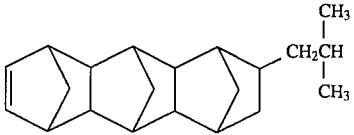

(473) 1,6,10-trimethyl-12-isobutylhexacyclo-[6.6.1.1$^{3,6}$.1$^{10,13}$.0$^{2,7}$.0$^{9,14}$]-4-heptadecene;

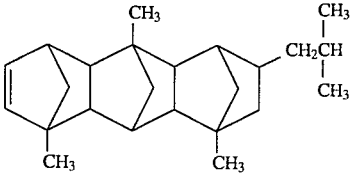

heptacyclo-5-eicosene dirivatives such as
(474) heptacyclo[8.7.0.1$^{2,9}$.1$^{4,7}$.1$^{11,17}$.0$^{3,8}$.0$^{3,8}$.0$^{12,16}$]-5-eicosene;

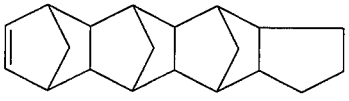

heptacyclo[8.7.0.1$^{3,6}$.1$^{10,17}$.1$^{12,13}$.0$^{2,7}$.0$^{11,16}$]-4-eicosene derivatives such as (475) heptacyclo[8.7.0.1$^{3,6}$.1$^{10,17}$.1$^{12,15}$.0$^{2,7}$.0$^{11,16}$]-4-eicosene

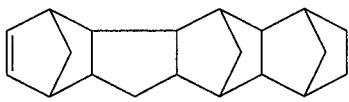

(476) dimethyl-substituted heptacyclo-[8.7.0.1$^{3,6}$.1$^{10,17}$.1$^{12,15}$.0$^{2,7}$.0$^{11,16}$]-4-eicosene;

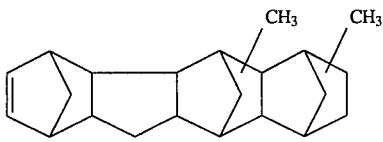

heptacyclo-5-heneicosene direvatives such as (477) heptacyclo[8.8.0.1$^{2,9}$.1$^{4,7}$.1$^{11,18}$.0$^{3,8}$.0$^{12,17}$]-5-heneicosene

(478) heptacyclo[8.8.0.1$^{4,7}$.1$^{11,18}$.1$^{13,16}$.0$^{3,8}$.0$^{12,17}$]-5-heneicosene

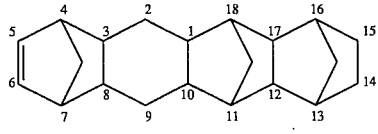

(479) 15-methyl-heptacyclo-[8.8.0.1$^{4,7}$.1$^{11,18}$.1$^{13,16}$.0$^{3,8}$.0$^{12,17}$]-5-heneicosene

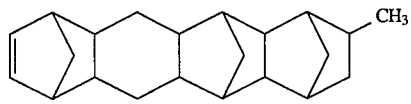

(480) trimethyl-substituted heptacyclo-[8.8.0.1$^{4,7}$.1$^{11,18}$.1$^{13,16}$.0$^{3,8}$.0$^{12,17}$]-5-heneicosene;

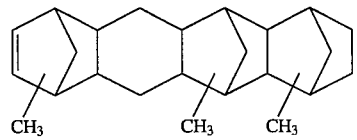

octacyclo[8.8.0.1$^{2,9}$.1$^{4,7}$.1$^{11,18}$.1$^{13,16}$.0$^{3,8}$.0$^{12,17}$]-5-docosene derivatives such as (481) octacyclo [8.8.0.1$^{2,9}$.1$^{11,18}$.1$^{13,16}$.0$^{3,8}$.0$^{12,17}$]-5-docosene

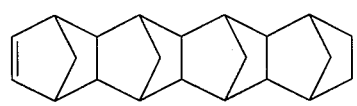

(482) 15-methyloctacyclo-[8.8.0.1$^{2,9}$.1$^{4,7}$.1$^{11,18}$.1$^{13,16}$.0$^{3,8}$.0$^{12,17}$]-5-docosene

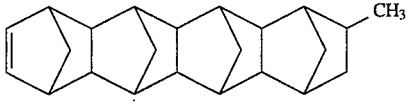

(483) 15-ethyloctacyclo-[8.8.0.1$^{2,9}$.1$^{4,7}$.1$^{11,18}$.1$^{13,16}$.0$^{3,8}$.0$^{12,17}$]-5-docosene;

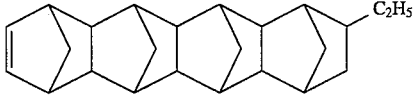

nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as (484) nonacyclo-[10.9.1.1$^{4,7}$.1$^{13,20}$.1$^{15,18}$.0$^{2,10}$.0$^{3,8}$.0$^{12,21}$.0$^{14,19}$]-5-pentacosene

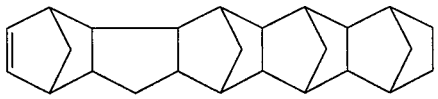

(485) trimethyl-subsutituted nonacyclo-[10.9.1.1$^{4,7}$.1$^{13,20}$.1$^{15,18}$.0$^{2,10}$.0$^{3,8}$.0$^{12,21}$.0$^{14,19}$]-5-pentacosene

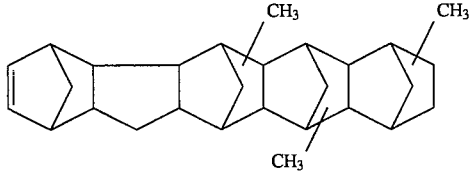

nonacyclo[10.10.1.1$^{5,8}$.1$^{14,21}$.1$^{16,19}$.0$^{2,11}$.0$^{4,9}$.0$^{13,22}$0$^{15,20}$]-6-hexacosene derivatives such as (486) nonacyclo-[10.10.1.1$^{5,8}$.1$^{14,21}$.1$^{16,19}$.0$^{2,11}$.0$^{4,9}$.0$^{13,22}$.0$^{15,20}$]-6-hexacosene;

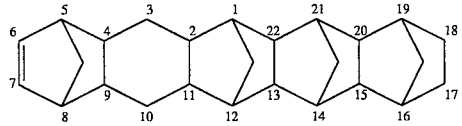

(487) 5-phenyl-bicyclo[2.2.1]hepto-2-en;

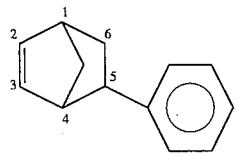

(488) 5-methyl-5-phenyl-bicyclo[2.2.1]hepto-2-en;

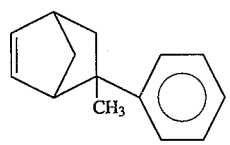

(489) 5-benzyl-bicyclo[2.2.1]hepto-2-en;

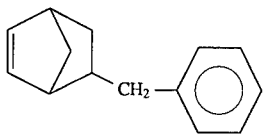

(490) 5-tolyl-bicyclo[2.2.1]hepto-2-en;

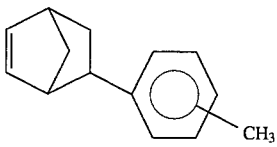

(491) 5-(ethylphenyl)-bicyclo[2.2.1]hepto-2-en;

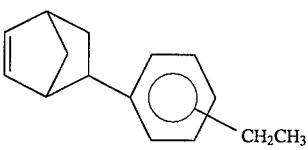

(492) 5-(isopropylphenyl)-bicyclo[2.2.1]hepto-2-en;

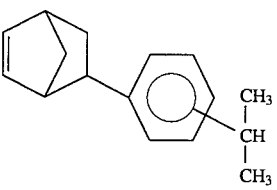

(493) 5-(biphenyl)-bicyclo[2.2.1]hepto-2-en;

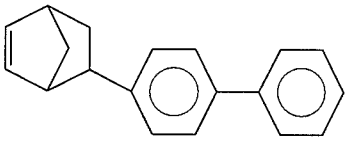

(494) 5-(β-naphthyl)-bicyclo[2.2.1]hepto-2-en;

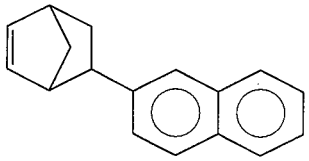

(495) 5-(α-naphthyl)-bicyclo[2.2.1]hepto-2-en;

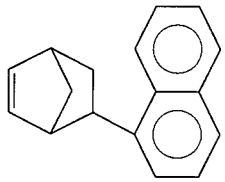

(496) 5-(anthracenyl)-bicyclo[2.2.1]hepto-2-en;

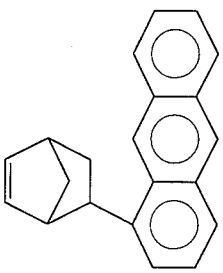

(497) 5,6-diphenyl-bicyclo[2.2.1]hepto-2-en;

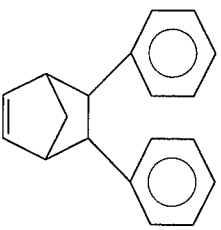

(498) cyclopentadiene-acenaphthylene adduct;

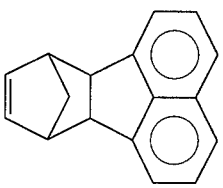

(499) 1,4-methano-1,4,4a,9a-tetrahydrofluorene;

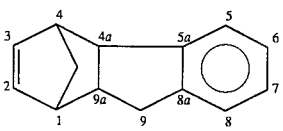

(500) 1,4-methano-1,4,4a,5,10,10a-hexahydroanthracene;

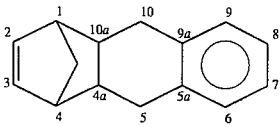

(501) 8-phenyl-tetracyclo[4.4.0.1$^{2,5}$.1$^{7,10}$]-3-dodecene;

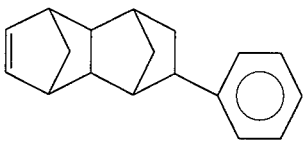

(502) 8-methyl-8-phenyl-tetracyclo[4.4.0.1$^{2,5}$.1$^{7,10}$]-3-dodecene;

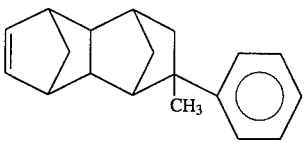

(503) 8-benzyl-tetracyclo[4.4.0.1$^{2,5}$.1$^{7,10}$]-3-dodecene;

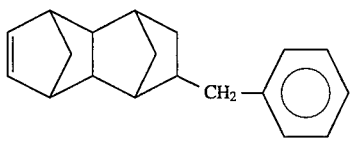

(504) 8-tolyl-tetracyclo[4.4.0.1$^{2,5}$.1$^{7,10}$]-3-dodecene;

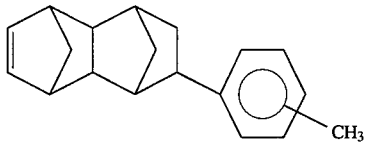

(505) 8-(ethylphenyl)-tetracyclo[4.4.0.1$^{2,5}$.1$^{7,10}$]-3-dodecene;

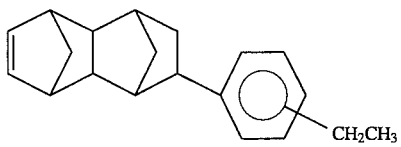

(506) 8-(isopropylphenyl)-tetracyclo[4.4.0.1$^{2,5}$.1$^{7,10}$]-3-dodecene;

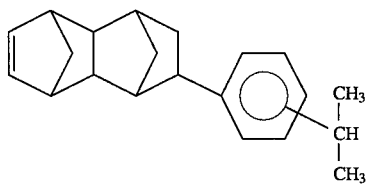

(507) 8,9-diphenyl-tetracyclo[4.4.0.1$^{2,5}$.1$^{7,10}$]-3-dodecene;

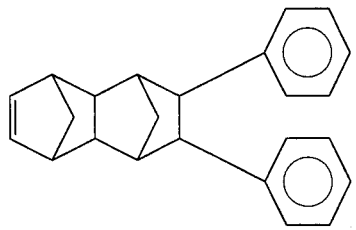

(508) 8-(biphenyl)-tetracyclo[4.4.0.1$^{2,5}$.1$^{7,10}$]-3-dodecene;

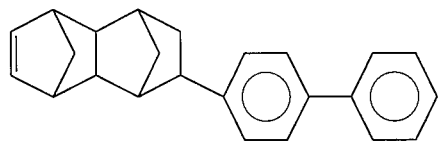

(509) 8-(β-naphthyl)-tetracycl[4.4.0.1$^{2,5}$.1$^{7,10}$]-3-dodecene;

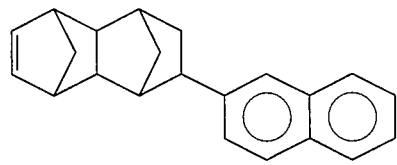

(510) 8-(α-naphthyl)-tetracyclo[4.4.0.1$^{2,5}$.1$^{7,10}$]-3-dodecene;

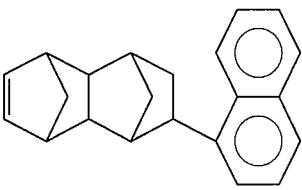

(511) 8-(anthracenyl)-tetracyclo[4.4.0.1$^{2,5}$.1$^{7,10}$]-3-dodecene;

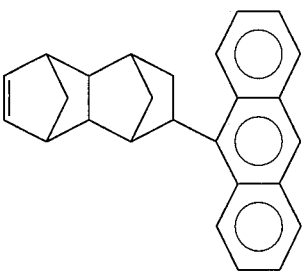

(512) compound obtained by further adding cyclopentadiene to cyclopentadiene-acenaphthylene adduct;

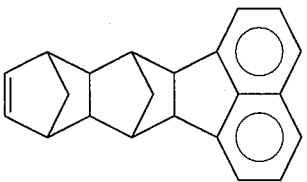

(513) 11,12-benzo-pentacyclo[6.5.1.1$^{3,6}$.0$^{2,7}$.0$^{9,13}$]-4-pentadecene;

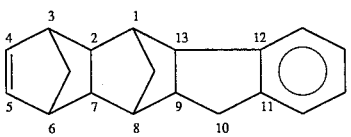

(514) 11,12-benzo-pentacyclo[6.6.1.1$^{3,6}$.0$^{2,7}$.0$^{9,14}$]-4-hexadecene;

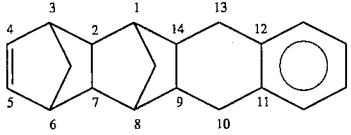

(515) 11-phenyl-hexacyclo[6.6.1.1$^{3,6}$.1$^{10,13}$.0$^{2,7}$.0$^{9,14}$]-4-heptadecene;

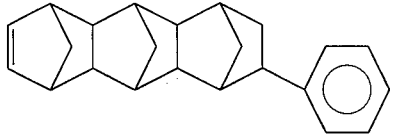

(516) 14,15-benzo-heptacyclo[8.7.0.1$^{2,9}$.1$^{11,17}$.0$^{3,8}$.0$^{12,16}$]-5-eicosene;

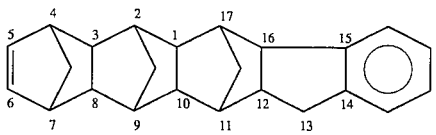

Further, examples of the cyclic olefin include cyclobutene, cyclopentene, cyclohexene, 3-methylcyclohexene, cycloheptene, cyclooctene, cyclodecene, cyclododecene and cycloeicosene.

Of these, preferable are bicyclo[2.2.1]-2-heptene derivatives, tetracyclo[4.4.0.1$^{2,5}$.1$^{7,10}$]-3-dodecene derivatives and hexacyclo[6.6.1.1$^{3,6}$.1$^{10,13}$.0$^{2,7}$.0$^{9,14}$]-4-heptadecene derivatives. Particularly preferable are bicyclo[2.2.1]-2-heptene and tetracyclo[4.4.0.1$^{2,5}$.1$^{7,10}$]-3-dodecene.

These cyclic olefins represented by formula [I], [II] or [III] can be used singly or in combination of two or more.

The cyclic olefins represented by formula [I] or [II] can be produced by allowing cyclopentadiene and an olefin having a structure corresponding thereto to react, by the Diels-Alder reaction.

Next, description is made on the catalyst (C). First, description is made on the transition metal compound ($C_1$) which constitutes the catalyst (C).

The transition metal compound ($C_1$) is represented by the formula [IV]. In the formula [IV], $M^1$ is titanium, zirconium, hafnium, vanadium, niobium or tantalum. Of these, zirconium and hafnium are preferable.

$R^1$ and $R^2$ are a hydrogen atom, a halogen atom, an alkyl group having 1 to 10 carbon atoms, an alkoxy group having 1 to 10 carbon atoms, an aryl group having 6 to 10 carbon atoms, an aryloxy group having 6 to 10 carbon atoms, an alkenyl group having 2 to 10 carbon atoms, an arylalkyl group having 7 to 40 carbon atoms, an alkylaryl group having 7 to 40 carbon atoms or an arylalkenyl group having 8 to 40 carbon atoms.

The halogen atom includes, for example, a fluorine atom, a chlorine atom, a bromine atom and an iodine atom.

Preferable examples of the alkyl group having 1 to 10 carbon atoms are methyl, ethyl, propyl, butyl, hexyl, octyl and decyl groups.

Preferable examples of the alkoxy group having 1 to 10 carbon atoms are methoxy, ethoxy, propoxy, butoxy, hexoxy, octoxy and decyloxy groups.

Preferable examples of the aryl group having 6 to 10 carbon atoms are phenyl and naphthyl groups.

Preferable examples of the aryloxy group having 6 to 10 carbon atoms are phenyloxy and naphthyloxy groups.

Preferable examples of the alkenyl group having 2 to 10 carbon atoms are ethenyl, propenyl, 4-methyl-1-pentenyl and decenyl groups.

Preferable examples of the alkylaryl group having 7 to 40 carbon atoms are tolyl, ethylphenyl, propylphenyl, n-butylphenyl and t-butylphenyl groups.

Preferable examples of the arylalkyl group having 7 to 40 carbon atoms are benzyl, phenethyl and 1-phenylpropyl groups.

Preferable examples of the arylalkenyl group having 8 to 40 carbon atoms are a phenylethylenyl group.

In the formula [IV], $R^3$ and $R^4$ are independently a hydrocarbon group of a single or multiple ring(s), having a cyclopentadienyl skeleton capable of coordinating to the central metal $M^1$. When $R^3$ and $R^4$ coordinate to the central metal $M^1$, a structure can be formed in which $M^1$ is sandwiched between $R^3$ and $R^4$.

Preferable examples of each of $R^3$ and $R^4$ are a cyclopentadienyl group or a substituted cyclopentadienyl group, an indenyl group or a substituted indenyl group, and a fluorenyl group or a substituted fluorenyl group. Preferable examples of the combination of $R^3$ and $R^4$ are (i) a combination of a cyclopentadienyl group or a substituted cyclopentadienyl group, and an indenyl group or a substituted indenyl group, (ii) a combination of a cyclopentadienyl group or a substituted cyclopentadienyl group, and a fluorenyl group or a substituted fluorenyl group, and (iii) a combination of an indenyl group or a substituted indenyl group, and an indenyl group or a substituted indenyl group.

In the above, "a substituted cyclopentadienyl, indenyl or fluorenyl group" refers to a cyclopentadienyl, indenyl or fluorenyl group whose at least one hydrogen atom is substituted by at least one group selected from an alkyl group of 1 to 10 carbon atoms and an aryl group of 6 to 10 carbon atoms.

Further in the formula [IV], $R^5$ is

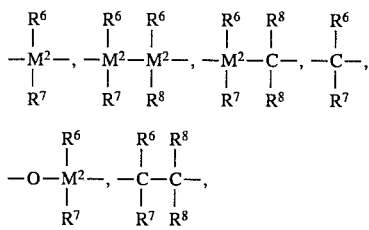

$=BR^6$, $=AlR^6$, —Ge—, —Sn—, —O—, —S—, $=SO$, $=SO_2$, $=NR^6$, $=CO$, $=PR^6$ or $=P(O)R^6$, wherein $R^6$, $R^7$ and $R^8$ are independently a hydrogen atom, a halogen atom, an alkyl group having 1 to 10 carbon atoms, a fluoroalkyl group having 1 to 10 carbon atoms, a fluoroaryl group having 6 to 10 carbon atoms, an aryl group having 6 to 10 carbon atoms, an alkoxy group having 1 to 10 carbon atoms, an alkenyl group having 2 to 10 carbon atoms, an arylalkyl group having 7 to 40 carbon atoms, an alkylaryl group having 7 to 40 carbon atoms or an arylalkenyl group having 8 to 40 carbon atoms, or $R^6$ and $R^7$ may be bonded to each other to form a ring together with the atom to which they bond, and $R^6$ and $R^8$ may also be bonded to each other to form a ring together with the atom to which they bond, and $M^2$ is silicon, germanium or tin.

The halogen atom includes, for example, a fluorine atom, a chlorine atom, a bromine atom and an iodine atom.

Preferable examples of the alkyl group having 1 to 10 carbon atoms are methyl, ethyl, propyl, butyl, hexyl, octyl and decyl groups.

Preferable examples of the fluoroalkyl group having 1 to 10 carbon atoms are trifluoromethyl, pentafluoroethyl and octafluoropropyl groups.

Preferable examples of the fluoroaryl group having 6 to 10 carbon atoms include a pentafluorophenyl group.

Preferable examples of the aryl group having 6 to 10 carbon atoms are phenyl and naphthyl groups.

Preferable examples of the alkoxy group having 1 to 10 carbon atoms are methoxy, ethoxy, propoxy, butoxy, hexoxy, octoxy and decyloxy groups.

Preferable examples of the alkenyl group having 2 to 10 carbon atoms are ethenyl, propenyl, 4-methyl-1-pentenyl and decenyl groups.

Preferable examples of the alkylaryl group having 7 to 40 carbon atoms are tolyl, ethylphenyl, propylphenyl, n-butylphenyl and t-butylphenyl groups.

Preferable examples of the arylalkyl group having 7 to 40 carbon atoms are benzyl, phenethyl and 1-phenylpropyl groups.

Preferable examples of the arylalkenyl group having 8 to 40 carbon atoms are a phenylethylenyl group.

$R^6$ and $R^7$ may be bonded to each other to form a ring together with the $M^2$ or carbon atom to which they bond. $R^6$ and $R^8$ may also form a ring, similarly.

$M^2$ is silicon, germanium or tin.

Specific examples of the transition metal compound of formula [IV] in which $M^1$ is zirconium, include the following compounds:

isopropylidene(cyclopentadienyl-methylcyclopentadienyl)zirconium dichloride,
isopropylidene(cyclopentadienyl-dimethylcyclopentadienyl)zirconium dichloride,
isopropylidene(cyclopentadienyl-trimethylcyclopentadienyl)zirconium dichloride,
isopropylidene(cyclopentadienyl-tetramethylcyclopentadienyl)zirconium dichloride,
isopropylidene(cyclopentadienyl-ethylcyclopentadienyl)zirconium dichloride,
isopropylidene(cyclopentadienyl-diethylcyclopentadienyl)zirconium dichloride,
isopropylidene(cyclopentadienyl-triethylcyclopentadienyl)zirconium dichloride,
isopropylidene(cyclopentadienyl-tetraethylcyclopentadienyl)zirconium dichloride,
isopropylidene(cyclopentadienyl-fluorenyl)zirconium dichloride,
isopropylidene(cyclopentadienyl-2,7-di-t-butylfluorenyl) zirconium dichloride,
isopropylidene(cyclopentadienyl-octahydrofluorenyl)zirconium dichloride,
isopropylidene(methylcyclopentadienyl-fluorenyl)zirconium dichloride,
isopropylidene(dimethylcyclopentadienyl-fluorenyl)zirconium dichloride,
isopropylidene(ethylcyclopentadienyl-fluorenyl)zirconium dichloride,
isopropylidene(diethylcyclopentadienyl-fluorenyl)zirconium dichloride,
isopropylidene(methylcyclopentadienyl-2,7-di-t-butylfluorenyl) zirconium dichloride,
isopropylidene(dimethylcyclopentadienyl-2,7-di-t-butylfluorenyl)zirconium dichloride,
isopropylidene(ethylcyclopentadienyl-2,7-di-t-butylfluorenyl)zirconium dichloride,
isopropylidene(diethylcyclopentadienyl-2,7-di-t-butylfluorenyl)zirconium dichloride,
isopropylidene(methylcyclopentadienyl-octahydrofluorenyl)zirconium dichloride,
isopropylidene(dimethylcyclopentadienyl-octahydrofluorenyl)zirconium dichloride,
isopropylidene(ethylcyclopentadienyl-octahydrofluorenyl)zirconium dichloride,
isopropylidene(diethylcyclopentadienyl-octahydrofluorenyl)zirconium dichloride,
cyclohexylidene(cyclopentadienyl-methylcyclopentadienyl)zirconium dichloride
cyclohexylidene(cyclopentadienyl-dimethylcyclopentadienyl)zirconium dichloride,
cyclohexylidene(cyclopentadienyl-trimethylcyclopentadienyl)zirconlum dichloride,
cyclohexylidene(cyclopentadlenyl-tetramethylcyclopentadienyl)zirconium dichloride,
cyclohexylidene(cyclopentadienyl-ethylcyclopentadienyl)zirconium dichloride,
cyclohexylidene(cyclopentadienyl-diethylcyclopentadienyl)zirconium dichloride,
cyclohexylidene(cyclopentadienyl-triethylcyclopentadienyl)zirconium dichloride,
cyclohexylidene(cyclopentadienyl-tetraethylcyclopentadienyl)zirconium dichloride,
cyclohexylidene(cyclopentadienyl-fluorenyl)zirconium dichloride,
cyclohexylidene(cyclopentadlenyl-2,7-di-t-butylfluorenyl)zirconium dichloride,
cyclohexylidene(cyclopentadienyl-octahydrofluorenyl)zirconium dichloride,
cyclohexylidene(methylcyclopentadienyl-fluorenyl)zirconium dichloride
cyclohexylidene(dimethylcyclopentadienyl-fluorenyl)zirconium dichloride,
cyclohexylidene(ethylcyclopentadienyl-fluorenyl)zirconium dichloride
cyclohexylidene(diethylcyclopentadienyl-fluorenyl)zirconium dichloride,
cyclohexylidene(methylcyclopentadienyl-2,7-di-t-butylfluorenyl)zirconium dichloride,
cyclohexylidene(dimethylcyclopentadienyl-2,7-di-t-butylfluorenyl)zirconium dichloride,
cyclohexylidene(ethylcyclopentadienyl-2,7-di-t-butylfluorenyl)zirconium dichloride,
cyclohexylidene(diethylcyclopentadienyl-2,7-di-t-butylfluorenyl)zirconium dichloride,
cyclohexylidene(methylcyclopentadlenyl-octahydrofluorenyl)zirconium dichloride,
cyclohexylidene(dimethylcyclopentadienyl-octahydrofluorenyl)zirconium dichloride,
cyclohexylidene(ethylcyclopentadienyl-octahydrofluorenyl)zirconium dichloride,
cyclohexylidene(diethylcyclopentadienyl-octahydrofluorenyl)zirconium dichloride,
diphenylmethylene(cyclopentadienyl-methylcyclopentadienyl)zirconium dichloride,
diphenylmethylene(cyclopentadienyl-dimethylcyclopentadienyl)zirconium dichloride,
diphenylmethylene(cyclopentadienyl-trimethylcyclopentadienyl)zirconium dichloride,
diphenylmethylene(cyclopentadienyl-tetramethylcyclopentadienyl)zirconium dichloride,
diphenylmethylene(cyclopentadienylethyl-ethelcyclopentadienyl)zirconium dichloride,
diphenylmethylene(cyclopentadienyl-diethylcyclopentadienyl)zirconium dichloride,
diphenylmethylene(cyclopentadienyl-triethylcyclopentadienyl)zirconium dichloride,
diphenylmethylene(cyclopentadienyl-tetraethylcyclopentadienyl)zirconium dichloride,
diphenylmethylene(cyclopentadienyl-fluorenyl)zirconium dichloride,
diphenylmethylene(cyclopentadienyl-2,7-di-t-butylfuorenyl)zirconium dichloride,
diphenylmethylene(cyclopentadienyl-octahydrofuorenyl)zirconium dichloride,
diphenylmethylene(methylcyclopentadienyl-fuorenyl)zirconium dichloride, diphenylmethylene(dimethylcyclopentadienyl-fuorenyl)zirconium dichloride,
diphenylmethylene(ethylcyclopentadienyl-fuorenyl)zirconium dichloride,
diphenylmethylene(diethylcyclopentadienyl-fuorenyl)zirconium dichloride,
diphenylmethylene(methylcyclopentadienyl-2,7-di-t-butylfuorenyl)zirconium dichloride,
diphenylmethylene(dimethylcyclopentadienyl-2,7-di-t-butylfuorenyl)zirconium dichloride,
diphenylmethylene(ethylcyclopentadienyl-2,7-di-t-butylfuorenyl)zirconium dichloride,
diphenylmethylene(diethylcyclopentadienyl-2,7-di-t-butylfuorenyl)zirconium dichloride,
diphenylmethylene(methylcyclopentadienyl-octahydrofuorenyl)zirconium dichloride,
diphenylmethylene(dimethylcyclopentadienyl-octahydrofuorenyl)zirconium dichloride,
diphenylmethylene(ethylcyclopentadienyl-octahydrofuorenyl)zirconium dichloride,
diphenylmethylene(diethylcyclopentadienyl-octahydrofuorenyl)zirconium dichloride,
dimethylsilylene(cyclopentadienyl-methylcyclopentadienyl)zirconium dichloride,
dimethylsilylene(cyclopentadienyl-dimethylcyclopentadienyl)zirconium dichloride,
dimethylsilylene(cyclopentadienyl-trimethylcyclopentadienyl)zirconium dichloride,
dimethylsilylene(cyclopentadienyl-tetramethylcyclopentadienyl)zirconium dichloride,
dimethylsilylene(cyclopentadienyl-ethylcyclopentadienyl)zirconium dichloride,
dimethylsilylene(cyclopentadienyl-diethylcyclopentadienyl)zirconium dichloride,
dimethylsilylene(cyclopentadienyl-triethylcyclopentadienyl)zirconium dichloride,
dimethylsilylene(cyclopentadienyl-tetraethylcyclopentadienyl)zirconium dichloride,
dimethylsilylene(cyclopentadienyl-fluorenyl)zirconium dichloride,
dimethylsilylene(cyclopentadienyl-2,7-di-t-butylfluorenyl)zirconium dichloride,
dimethylsilylene(cyclopentadienyl-octahydrofluorenyl)zirconium dichloride,
dimethylsilylene(methylcyclopentadienyl-fluorenyl)zirconium dichloride,
dimethylsilylene (dimethylcyclopentadienyl-fluorenyl)zirconium dichloride,
dimethylsilylene(ethylcyclopentadienyl-fluorenyl)zirconium dichloride,
dimethylsilylene(diethylcyclopentadienyl-fluorenyl)zirconium dichloride,
dimethylsilylene(methylcyclopentadienyl-2,7-di-t-butylfluorenyl)zirconium dichloride,
dimethylsilylene(dimethylcyclopentadienyl-2,7-di-t-butylfluorenyl)zirconium dichloride,
dimethylsilylene(ethylcyclopentadienyl-2,7-di-t-butylfluorenyl)zirconium dichloride,
dimethylsilylene(diethylcyclopentadienyl-2,7-di-t-butylfluorenyl)zirconium dichloride,
dimethylsilylene(methylcyclopentadienyl-octahydrofluorenyl)zirconium dichloride,
dimethylsilylene(dimethylcyclopentadienyl-octahydrofluorenyl)zirconium dichloride,
dimethylsilylene(ethylcyclopentadienyl-octahydrofluorenyl)zirconium dichloride,
dimethylsilylene(diethylcyclopentadienyl-octahydrofluorenyl)zirconium dichloride,
isopropylidene(cyclopentadienyl-indenyl)zirconium dichloride,
isopropylidene(methylcyclopentadienyl-indenyl)zirconium dichloride,
isopropylidene(dimethylcyclopentadienyl-indenyl)zirconium dichloride,
isopropylidene(ethylcyelopentadienyl-indenyl)zirconium dichloride,
isopropylidene(diethyleyelopentadienyl-indenyl)zirconium dichloride
isopropylidene(cyclopentadienyl-benzoindenyl)zirconium dichloride,
isopropylidene(cyclopentadienyltetrahydroindenyl)zirconium dichloride,
isopropylidene(methylcyclopentadienyl-tetrahydroindenyl)zirconium dichloride,
isopropylidene(dimethylcyclopentadienyl-tetrahydroindenyl)zirconium dichloride,
isopropylidene(ethylcyclopentadienyl-tetrahydroindenyl)zirconium dichloride,
isopropylidene(diethylcyclopentadienyl-tetrahydroindenyl)zirconium dichloride,
dimethylsilylenebis(cyclopentadienyl)zirconium monochloride monohydride,
dimethylsilylenebis(cyclopentadienyl)zirconium dichloride,
dimethylsilylenebis(cyclopentadienyl)methylzirconium monochloride,
dimethylsilylenebis(cyclopentadienyl)dimethylzirconium,
dimethylsilylenebis(cyclopentadienyl)diphenylzirconium,
silylenebis(cyclopentadienyl)zirconium dichloride,
silylenebis(cyclopentadienyl)dimethylzirconium,
diethylsilylenebis(cyclopentadienyl)zirconium dichloride,
diethylsilylenebis(cyclopentadienyl)dimethylzirconium,
dimethylsilylenebis(cyclopentadienyl)zirconium dihydride,
dimethylsilylenebis(indenyl)zirconium dichloride,
dimethylsilylenebis(indenyl)zirconium monochloride monohydride,
dimethylsilylenebis(indenyl)ethoxyzirconium chloride,
dimethylsilylenebis(indenyl)dimethylzirconium,
dimethylsilylenebis(indenyl)diethylzirconium,
dimethylsilylenebis(indenyl)dibenzylzirconium,
dimethylsilylenebis(indenyl)methylzirconium monobromide,
dimethylsilylenebis(indenyl)ethylzirconium monobromide,
dimethylsilylenebis(indenyl)benzylzirconium monochloride,
dimethylsilylenebis(indenyl)methylzirconium monochloride,
dimethylsilylenebis(indenyl)zirconium dibromide, dimethylsilylenebis(4,5,6,7-tetrahydro-1-indenyl)dimethylzirconium, dimethylsilylenebis(4,5,6,7-tetrahydro-1-indenyl)ethylzirconium ethoxide, dimethylsilylenebis (4,5,6,7-tetrahydro-1-indenyl)zirconium dichloride, dimethylsilylenebis(4,5,6,7-tetrahydro-1-indenyl)zirconium dichloride, dimethylsilylenebis(4-methyl-1-indenyl)zirconium dichloride, dimethylsilylenebis(5-methyl-1-indenyl)zirconium dichloride, dimethylsilylenebis(6-methyl-1-indenyl)zirconium dichloride, dimethylsilylenebis(7-methyl-1-indenyl)zirconium dichloride, dimethylsilylenebis(2,3-dimethyl-1-indenyl)zirconium dichloride, dimethylsilylenebis(4,7-dimethyl-1-indenyl)zirconium dichloride, dimethylsilylenebis(4,7-dimethoxy-1-indenyl)zirconium dichloride, dimethylsilylenebis(indenyl)zirconium methoxide, dimethylsilylenebis(indenyl)zirconium diethoxide, dimethylsilylenebis(indenyl)methoxyzirconium chloride, dimethylsilylenebis(indenyl)ethoxyzirconium chloride, dimethylsilylenebis(indenyl)methylzirconium chloride.

dimethylsilylenebis(4,5,6,7-tetrahydro-1-indenyl)zirconium dimethoxide, dimethylsilylenebis(4,5,6,7-tetrahydro-1-indenyl)zirconium diethoxide, dimethylsilylenebis(4,5,6,7-tetrahydro-1-indenyl) methoxyzirconium chloride, dimethylsilylenebis(4,5,6,7-tetrahydro-1-indenyl) ethoxyzirconium chloride, dimethylsilylenebis(4,5,6,7-tetrahydro-1-indenyl) methylzirconium ethoxide, dimethylsilylenebis(indenyl)zirconium dichloride, diethylsilylenebis(indenyl)dimethylzirconium, diethylsilylenebis(4,5,6,7-tetrahydro-1-indenyl)zirconium dichloride, diethylsilylenebis(fluorenyl)zirconium dichloride, dimethylsilylenebis(fluorenyl)dimethylzirconium, dimethylsilylenebis(fluorenyl)diphenylzirconium, dimethylsilylenebis(fluorenyl)zirconium dichloride, ethylenebis(indenyl)zirconium dichloride, ethylenebis(indenyl)zirconium dibromide, ethylenebis(indenyl)dimethylzirconium, ethylenebis(indenyl)diphenylzirconium, ethylenebis(indenyl)dimethylzirconium monochloride, ethylenebis(indenyl)zirconium bis(methanesulfonate), ethylenebis(indenyl)zirconium bis(p-toluenesulfonate), ethylenebis(indenyl)zirconium bis(trifluoromethanesulfonate), and ethylenebis(tetrahydroindenyl)zirconium dichloride.

Particularly preferable examples of the transition metal compound ($C_1$) are:

isopropylidene(cyclopentadienyl-fluorenyl)zirconium dichloride, isopropylidene(methylcyclopentadienyl-fluorenyl)zirconium dichloride, isopropylidene(isopropylcyclopentadienyl-fluorenyl)zirconium dichloride, isopropylidene(cyclopentadienyl-indenyl)zirconium dichloride, isopropylidene(cyclopentadienylbenzoindenyl)zirconium dichloride, diphenylmethylene((cyclopentadienyl-indenyl)zirconium dichloride, and ethylenebis(indenyl)zirconium chloride.

The transition metal compounds used in the present invention, in which $M^1$ is titanium, hafnium, vanadium, niobium or tantalum, can be exemplified by the same compounds as the above zirconium compounds, of which the central metal is one of the above metals in place of zirconium.

These transition metal compounds may be deposited on a carrier.

The catalyst (C) used in the present invention comprises ($C_1$) a transition metal compound mentioned above and ($C_2$) at least one member selected from the group consisting of an organic aluminum oxy compound, a compound capable of reacting with said transition metal compound ($C_1$) to form an ionic complex, and a combination of at least one of these two compounds with an organic aluminum compound.

The organic aluminum oxy compound as the component ($C_2$) may be a benzene-soluble alumoxane or a benzene-insoluble organic aluminum oxy compound.

The benzene-soluble alumoxane is known and specifically is represented by the following general formula.

$$R_2Al\text{-}(OAl)_{\overline{n}}\text{-}OAlR_2$$
$$|$$
$$R$$

$$\text{---}(OAl)_{m+2}\text{---}$$
$$|$$
$$R$$

wherein R is a hydrocarbon group such as methyl group, ethyl group, propyl group or butyl group, preferably methyl group and ethyl group, particularly preferably methyl group, and each of m and n is an integer of 2 or more, preferably 5 to 40.

The alumoxane may be formed of an alkyloxy aluminum unit mixture which consists of an alkyloxy aluminum unit represented by the formula ($OAl(R^1)$) and an alkyloxy aluminum unit represented by the formula ($OAl(R^2)$) [in these formulas, $R^1$ and $R^2$ are a hydrocarbon group like R, but different from each other].

Alumoxane soluble in benzene may be prepared by the following methods, for example, and generally recovered as a solution of an aromatic hydrocarbon solvent. The methods include:

(1) a method in which an organic aluminum compound such as trialkyl aluminum is added to and reacted with an aromatic hydrocarbon solvent having suspended therein a compound containing absorbed water or a salt containing water of crystallization, such as a hydrate of magnesium chloride, copper sulfate, aluminum sulfate, nickel sulfate or cerium chloride, to recover the alumoxane as a solution of an aromatic hydrocarbon solvent; and (2) a method in which water (water, ice or steam) is caused to directly act on an organic aluminum compound such as trialkyl aluminum in a medium such as benzene, toluene, ethyl ether or tetrahydrofuran to recover the alumoxane as a solution of an aromatic hydrocarbon solvent.

Among these methods, the preferred is the method (1).

Illustrative examples of the organic aluminum compound used for the preparation of an alumoxane solution include trialkyl aluminums such as trimethyl aluminum, triethyl aluminum, tripropyl aluminum, triisopropyl aluminum, tri-n-butyl aluminum, triisobutyl aluminum, tri-sec-butyl aluminum, tri-tert-butyl aluminum, tripentyl aluminum, trihexyl aluminum, trioctyl aluminum and tridecyl aluminum; tricycloalkyl aluminums such as tricyclohexyl aluminum and tricyclooctyl aluminum;

dialkyl aluminum halides such as dimethyl aluminum chloride, diethyl aluminum chloride, diethyl aluminum bromide and diisobutyl aluminum chloride;

dialkyl aluminum hydrides such as diethyl aluminum hydride and diisobutyl aluminum hydride;

alkyl aluminum alkoxides such as dimethyl aluminum methoxide and diethyl aluminum ethoxide; and dialkyl aluminum aryloxides such as diethyl aluminum phenoxide.

Among these, particularly preferred are trialkyl aluminums.

As the organic aluminum compound, isoprenyl aluminum represented by the following general formula may also be used.

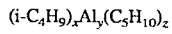

wherein x, y and z are each a positive integer and $z \geq 2x$.

The above organic aluminum compounds may be used alone or in combination of two or more.

The benzene-insoluble organic aluminum oxy compound may be obtained by bringing a solution of alumoxane into contact with water or an active hydrogen-containing compound or by bringing the above organic aluminum compound into contact with water, for example.

It is desired that the benzene-insoluble organic aluminum oxy compound used as ($C_2$) component in the present invention should have the ratio ($D_{1260}/D_{1220}$) of absorbance ($D_{1260}$) at the neighborhood of 1,260 $cm^{-1}$ to absorbance ($D_{1220}$) at the neighborhood of 1,220 $cm^{-1}$, measured by infrared spectroscopy (IR), of not more than 0.09, preferably not more than 0.08, particularly preferably in the range of 0.04 to 0.07.

The benzene-insoluble organic aluminum oxy compound as described above is presumed to have an alkyloxy aluminum unit represented by the following formula:

In the above formula, $R^7$ is a hydrocarbon group having 1 to 12 carbon atoms such as methyl group, ethyl group, n-propyl group, isopropyl group, n-butyl group, isobutyl group, pentyl group, hexyl group, octyl group, decyl group, cyclohexyl group or cyclooctyl group, among which methyl and ethyl groups are preferred and methyl group is particularly preferred.

In addition to the alkyloxy aluminum unit represented by the above formula, the benzene-insoluble organic aluminum oxy-compound may also contain an oxy aluminum unit represented by the following formula:

In the above formula, $R^8$ is selected from the group consisting of a hydrocarbon group having 1 to 12 carbon atoms, an alkoxy group having 1 to 12 carbon atoms, an aryloxy group having 6 to 20 carbon atoms, a hydroxyl group, a halogen atom and a hydrogen atom.

$R^8$ and $R^7$ of the above formulas are different from each other.

When the benzene-insoluble organic aluminum oxy compound contains an oxy aluminum unit, it is desired that the organic aluminum oxy compound should contain an alkyloxy aluminum unit in a proportion of at least 30 mol %, preferably at least 50 mol %, particularly preferably at least 70 mol %.

Such a benzene-insoluble organic aluminum oxy compound contains an Al component soluble in benzene heated at 60° C. in an amount of not more than 10%, preferably not more than 5%, particularly preferably not more than 2%, in terms of Al atoms, and, hence, is insoluble or difficult to be soluble in benzene.

The organic aluminum oxy compound used in the present invention may contain small amounts of organic compounds of metals other than aluminum.

The organic aluminum oxy compound may be used by being deposited on a carrier compound.

As the compound [which is used as the component ($C_2$)] capable of reacting with the transition metal compound ($C_1$) to form an ionic complex, there can preferably be used, for example, a compound comprising a cation and an anion formed of an element and a plurality of groups bonded thereto, in particular, a coordination compound comprising a cation and an anion formed of an element and a plurality of groups bonded thereto. As such a compound comprising a cation and an anion formed of an element and a plurality of groups bonded thereto, there can preferably be used compounds represented by the following formula [V] or [VI]:

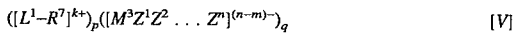

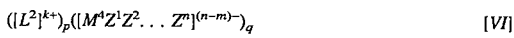

wherein $L^2$ is $M^5$, $R^8R^9M^6$, $R^{10}{}_3C$ or $R^{11}M^6$.

In the formulas [V] and [VI], $L^1$ is a Lewis base; $M^3$ and $M^4$ are independently an element selected from the elements of the groups VB, VIB, VIIB, VIII, IB, IIB, IIIA, IVA and VA of the periodic table; $M^5$ and $M^6$ are independently an element selected from the groups IIIB, IVB, VB, VIB, VIIB, VIII, IA, IB, IIA, IIB and VIIA of the periodic table; $Z^1$ to $Z^n$ are independently a hydrogen atom, a dialkylamino group, an alkoxy group having 1 to 20 carbon atoms; an aryloxy group having 6 to 20 carbon atoms, an alkyl group having 1 to 20 carbon atoms; an aryl, alkylaryl or arylalkyl group having 6 to 20 carbon atoms, a halogen-substituted hydrocarbon group having 1 to 20 carbon atoms, an acyloxy group having 1 to 20 carbon atoms, an organic metalloid group or a halogen atom; two or more of $Z^1$ to $Z^n$ may be bonded together to form a ring; $R^7$ is a hydrogen atom, an alkyl group having 1 to 20 carbon atoms, an aryl group having 6 to 20 carbon atoms, an alkylaryl group or an arylalkyl group; $R^8$ and $R^9$ are independently a cyclopentadienyl group, a substituted cyclopentadienyl group, an indenyl group or a fluorenyl group; $R^{10}$ is an alkyl group having 1 to 20 carbon atoms, an aryl group, an alkylaryl group or an arylalkyl group; $R^{11}$ is a large cyclic ligand such as tetraphenylporphyrin, phthalocyanin or the like; m is the valence of $M^3$ or $M^4$ and is an integer of 1 to 7; n is an integer of 2 to 8; k is the ionic valence of $[L^1-R^7]$ or $[L^2]$ and is an integer of 1 to 7; p is an integer of 1 or more; and $q = (p \times k)/(n-m)$.

Specific examples of the Lewis base are amines such as ammonia, methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline, p-nitro-N,N-dimethylaniline and the like; phosphines such as triethylphosphine, triphenylphosphine, diphenylphosphine and the like; ethers such as dimethyl ether, diethyl ether, tetrahydrofuran, dioxane and the like; thioethers such as diethyl thioether, tetrahydrothiophene and the like; and esters such as ethyl benzoate and the like.

Specific examples of $M^3$ and $M^4$ are B, Al, Si, P, As and Sb. Specific examples of $M^5$ are Li, Na, Ag, Cu, Br, I and $I^3$. Specific examples of $M^6$ are Mn, Fe, Co, Ni and Zn. As to specific examples of $Z^1$ to $Z^n$, the dialkylamino group includes a dimethylamino group and a diethylamino group; the alkoxy group having 1 to 20 carbon atoms includes a methoxy group, an ethoxy group and a n-butoxy group; the aryloxy group having 6 to 20 carbon atoms includes a phenoxy group, a 2,6-dimethylphenoxy group and a naphthyloxy group; the alkyl group having 1 to 20 carbon atoms includes a methyl group, an ethyl group, a n-propyl group, an isopropyl group, a n-butyl group, a n-octyl group and a 2-ethylhexyl group; the aryl, alkylaryl or arylalkyl group having 6 to 20 carbon atoms includes a phenyl group, a p-tolyl group, a benzyl group, a 4-t-butylphenyl group, a 2,6-dimethylphenyl group, a 3,5-dimethylphenyl group, a 2,4-dimethylphenyl group and a 2,3-dimethylphenyl group; the halogen-substituted hydrocarbon group having 1 to 20 carbon atoms includes a p-fluorophenyl group, a 3,5-difluorophenyl group, a pentachlorophenyl group, a 3,4,5-trifluorophenyl group, a pentafluorophenyl group and a 3,5-di(trifluoromethyl)phenyl group; the halogen atom includes F, Cl, Br and I; and the organic metalloid group includes a pentamethylantimony group, a trimethylsilyl group, a trimethylgermyl group, a diphenylarsine group, a dicyclohexylantimony group and a diphenylboron group.

Specific examples of $R^7$ and $R^{10}$ can be the same groups as mentioned for $Z^1$ to $Z^n$. Specific examples of the substituted cyclopentadienyl group as $R^8$ or $R^9$ are alkyl-substituted cyclopentadienyl groups such as methylcyclopentadienyl group, butylcyclopentadienyl group, pentamethylcyclopentadienyl group and the like. In these compounds, the alkyl group has generally 1 to 6 carbon atoms and the number of the alkyl substituents is selected from integers of 1 to 5.

Of the compounds of formula [V] or [VI], there are preferred those in which $M^3$ or $M^4$ is boron.

Of the compounds of [V] or [VI], there are particularly preferred the following specific compounds.
Compounds of formula [V]:
  triethylammonium tetraphenylborate,
  tri(n-butyl)ammonium tetraphenylborate,
  trimethylammonium tetraphenylborate,
  tetraethylammonium tetraphenylborate,
  methyltri(n-butyl)ammonium tetraphenylborate,
  benzyltri(n-butyl)ammonium tetraphenylborate,
  dimethyldiphenylammonium tetraphenylborate,
  methyltriphenylammonium tetraphenylborate,
  trimethylanilinium tetraphenylborate,
  methylpyridinium tetraphenylborate,
  benzylpyridinium tetraphenylborate,
  methyl(2-cyanopyridinium) tetaphenylborate,
  trimethylsulfonium tetraphenylborate,
  benzyldimethylsulfonium tetraphenylborate,
  triethylammonium tetra(pentafluorophenyl)borate,
  tri(n-butyl)ammonium tetra(pentafluorophenyl)borate,
  triphenylammonium tetra(pentafluorophenyl)borate,
  tetrabutylammonium tetra(pentafluorophenyl)borate,
  tetraethylammonium tetra(pentafluorophenyl)borate,
  methyltri(n-butyl)ammonium tetra(pentafluorophenyl)borate,
  benzyltri(n-butyl)ammonium tetra(pentafluorophenyl)borate,
  methyldiphenylammonium tetra(pentafluorophenyl)borate,
  methyltriphenylammonium tetra(pentafluorophenyl)borate,
  dimethyldiphenylammonium tetra(pentafluorophenyl)borate,
  anilinium tetra(pentafluorophenyl)borate,
  methylanilinium tetra(pentafluorophenyl)borate,
  dimethylanilinium tetra(pentafluorophenyl)borate,
  trimethylanilinium tetra(pentafluorophenyl)borate,
  dimethyl(m-nitroanilinium) tetra(pentafluorophenyl)borate,
  dimethyl(p-bromoanilinium) tetra(pentafluorophenyl)borate,
  pyridinium tetra(pentafluorophenyl)borate,
  (p-cyanopyridinium) tetra(pentafluorophenyl)borate,
  (N-methylpyridinium) tetra(pentafluorophenyl)borate,
  (N-benzylpyridinium) tetra(pentafluorophenyl)borate,
  (o-cyano-N-methylpyridinium) tetra(pentafluorophenyl)borate,
  (p-cyano-N-methylpyridinium) tetra(pentafluorophenyl)borate,
  (p-cyano-N-benzylpyridinium) tetra(pentafluorophenyl)borate,
  trimethylsulfonium tetra(pentafluorophenyl)borate,
  benzyldimethylsulfonium tetra(pentafluorophenyl)borate
  tetraphenylsulfonium tetra(pentafluorophenyl)borate,
  dimethylanilinium tetra(3,5-ditrifluoromethylphenyl)borate, and
  triethylammonium hexafluoroarsenate.
Compounds of formula [VI]:
  ferrocenyl tetraphenylborate,
  silver tetraphenylborate,
  triphenylcarbenium tetraphenylborate,
  tetraphenylporphyrin manganese tetraphenylborate*,

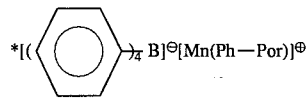

(wherein Ph-Por stands for tetraphenylporphyrin.)
  ferrocenyl tetra(pentafluorophenyl)borate,
  1,1'-dimethylferrocenyl tetra(pentafluorophenyl)borate,
  decamethylferrocenyl tetra(pentafluorophenyl)borate,
  acetylferrocenyl tetra(pentafluorophenyl)borate,
  formylferrocenyl tetra(pentafluorophenyl)borate,
  cyanoferrocenyl tetra(pentafluorophenyl)borate,
  silver tetra(pentafluorophenyl)borate,
  triphenylcarbenium tetra(pentafluorophenyl)borate,
  lithium tetra(pentafluorophenyl)borate,
  sodium tetra(pentafluorophenyl)borate, tetraphenylporphyrin manganese tetra(pentafluorophenyl)borate, tetraphenylporphyrin (chloro) ferric tetra(pentafluorophenyl)borate**,

**[(F—⟨⟩—)₄B]⁻[Fe(Ph—Por)Cl]⁺

(wherein Ph-Por stands for tetraphenylporphyrin.)

tetraphenylporphyrin zinc tetra(pentafluorophenyl)borate,
silver tetrafluoroborate,
silver tetrafluoroarsenate, and
silver tetrafluoroantimonate.

It is also possible to use compounds other than those of formula [V] or [VI], for example, tri(pentaflurophenyl)boron, tri[3,5-di(trifluoromethyl)phenyl]boron, triphenylboron, etc.

The organic aluminum compound which constitutes the component ($C_2$) in combination with the organic aluminum oxy compound and/or the compound capable of reacting with the transition metal compound ($C_1$) to form an ionic complex, can be exemplified by organic aluminum compounds represented by the following general formula [VII]:

$$R^5_nAlX_{3-n} \quad [VII]$$

wherein $R^5$ is a hydrocarbon group having 1 to 12 carbon atoms; X is a halogen atom or a hydrogen atom; and n is 1 to 3.

$R^5$ is a hydrocarbon group having 1 to 12 carbon atoms such as alkyl group, cycloalkyl group or aryl group. Specific examples of $R^5$ are a methyl group, an ethyl group, a n-propyl group, an isopropyl group, an isobutyl group, a pentyl group, a hexyl group, an octyl group, a cyclopentyl group, a cyclohexyl group, a phenyl group and a tolyl group.

Specific examples of the organic aluminum compounds represented by formula [VII] are:

trialkylaluminums such as trimethylaluminum, triethylaluminum, triisopropylaluminum, triisobutylaluminum, trioctylaluminum, tri-2-ethylhexylaluminum and the like;

alkenylaluminums such as isoprenylaluminum and the like;

dialkylaluminum halides such as dimethylaluminum chloride, diethylaluminum chloride, diisopropylaluminum chloride, diisobutylaluminum chloride, dimethylaluminum bromide and the like;

alkylaluminum sesquihalides such as methylaluminum sesquichloride, ethylaluminum sesquichloride, isopropylaluminum sesquichloride, butylaluminum sesquichloride, ethylaluminum sesquibromide and the like;

alkylaluminum dihalides such as methylaluminum dichloride, ethylaluminum dichloride, isopropylaluminum dichloride, ethylaluminum dibromide and the like; and alkylaluminum hydrides such as diethylaluminum hydride, diisobutylaluminum hydride and the like.

It is also possible to use, as the organic aluminum compound, a compound represented by the following general formula [VIII]:

$$R^5_nAlY_{3-n} \quad [VIII]$$

wherein $R^5$ has the same definition as in formula [VII]; Y is a $—OR^6$ group, a $—OSiR^7_3$ group, a $—OAlR^8_2$ group, a $—NR^9_2$ group, a $—SiR^7_3$ group or a $—N(R^{11})AlR^{12}_2$ group ($R^6$, $R^7$, $R^8$ and $R^{12}$ are each a methyl group, an ethyl group, an isopropyl group, an isobutyl group, a cyclohexyl group, a phenyl group or the like, $R^9$ is a hydrogen atom, a methyl group, an ethyl group, an isopropyl group, a phenyl group, a trimethylsilyl group or the like, and $R^{10}$ and $R^{11}$ are each a methyl group, an ethyl group or the like); and n is 1 or 2.

Specific examples of the organic aluminum compound represented by formula [VIII] are:

(i) compounds represented by $R^5_nAl(OR^6)_{3-n}$, such as dimethylaluminum methoxide, diethylaluminum ethoxide, diisobutylaluminum methoxide and the like, (ii) compounds represented by $R^5_nAl(OSiR^7_3)_{3-n}$, such as $Et_2Al(OSiMe_3)$, $(iso-Bu)_2Al(OSiMe_3)$, $(isoBu)_2Al(OSiEt_3)$ and the like, (iii) compounds represented by $R^5_nAl(OAlR^8_2)_{3-n}$, such as $Et_2AlOAlEt_2$, $(iso-Bu)_2AlOAl(iso-Bu)_2$ and the like, (iv) compounds represented by $R^5_nAl(NR^9_2)_{3-n}$, such as $Me_2AlNEt_2$, $Et_2AlNHMe$, $Me_2AlNHEt$, $Et_2AlN(SiMe_3)_2$, $(iso-Bu)_2AlN(SiMe_3)_2$ and the like, (v) compounds represented by $R^5nAl(SiR^{10}_3)_{3-n}$, such as $(iso-Bu)_2AlSiMe_3$ and the like, and (vi) compounds represented by $$R^5_nAl(NAlR^{12}_2)_{3-n},$$
$$|$$
$$R^1$$

such as $$Et_2AlNAlEt_2, \quad (iso-Bu)_2AlNAl(iso-Bu)_2$$
$$| \qquad\qquad |$$
$$Me \qquad\qquad Et$$

and the like.

Of the above organic aluminum compounds, preferable are those represented by general formula $R^5_3Al$, $R^5_nAl(OR^6)_{3-n}$ or $R^5_nAl(OAlR^8_2)_{3-n}$. Those wherein $R^5$ is an isoalkyl group and n is 2, are particularly preferable. These organic aluminum compounds may be used singly or in combination of two or more.

In the process of the present invention, ethylene (A) and the cyclic olefin compound (B) are copolymerized in the presence of the catalyst (C) and the α-olefin (D) having 3 to 20 carbon atoms to produce a cyclic olefin copolymer. The α-olefin (D) having 3 to 20 carbon atoms is used in a molar ratio of α-olefin (D) to ethylene (A), of 0.0005 to 0.2, preferably 0.001 to 0.2.

Specific examples of the α-olefin (D) having 3 to 20 carbon atoms are propylene, 1-butene, 1-pentene, 1-hexene, 4-methyl-1-pentene, 1-octene, 1decene, 1-dodecene, 1-tetradecene, 1-hexadecene, 1octadecene, 1-eicosene, styrene and 4-phenyl-1-butene. Of these, propyele, 1-butene, 1-pentene and 1-hexene are preferred.

The α-olefin acts as a molecular weight modifier. Therefore, no hydrogen gas is necessary which is used in the conventional olefin polymerization employing a Ziegler type catalyst as a molecular weight modifier.

In the process of the present invention, any of solution polymerization, bulk polymerization and slurry polymerization can be used. Also, any of continuous polymerization and batch polymerization can be employed.

The molar ratio of α-olefin to ethylene can be determined by:

(i) the molar ratio of the amount per unit time of α-olefin fed to the reactor to the amount per unit time of ethylene fed to the reactor, in the case of continuous polymerization, and (ii) the molar ratio of the total amount of α-olefin fed to the reactor to the total amount of ethylene fed to the reactor, in the case of batch polymerization.

When the copolymerization is conducted by batch polymerization, it can be conducted by any of a mode which comprises continuously feeding both ethylene and an α-olefin to the batchwise reactor, and a mode which comprises adding the whole amount of an α-olefin at the initial polymerization stage and then continuously feeding ethylene to the batchwise reactor. The latter mode includes a case wherein the polymerization pressure is kept constant by the feeding of ethylene.

The solvent used in the copolymerization is selected from aliphatic hydrocarbons such as hexane, heptane, octane, kerosene and the like; alicyclic hydrocarbons such as cyclohexane, methylhexane and the like; and aromatic hydrocarbons such as benzene, toluene, xylene and the like. These solvents can be used singly or in combination of two or more.

In the copolymerization, the temperature for polymerization is $-50°$ to $230°$ C., preferably $-30°$ to $200°$ C., more preferably $-20°$ to $150°$ C.; the time for polymerization is 2 minutes to 5 hours, preferably 5 minutes to 3 hours; and the pressure for polymerization is more than 0 to $100$ kg/cm$^2$, preferably more than 0 to $50$ kg/cm$^2$.

The catalyst (C) can be prepared by feeding the components ($C_1$) and ($C_2$) separately into a reactor where polymerization is taking place, to contact them with each other and form a catalyst (C) therein. Alternatively, the components ($C_1$) and ($C_2$) are contacted in advance with each other outside the reactor to form a catalyst (C) and then, the catalyst (C) is fed into the reactor.

In the copolymerization, the concentration of the transition metal compound ($C_1$) is preferably 0.00005 to 1.0 mM/liter, more preferably 0.0001 to 0.3 mM/liter. The concentration of the organic aluminum oxy compound or the compound capable of reacting with the transition metal compound to form an ionic complex is preferably 1 to $10^4$ equivalents of the transition metal compound. The concentration of the organic aluminum compound relative to the aluminum atom of the organic aluminum oxy compound or relative to the complex metal atom of the compound capable of reacting with the transition metal compound to form an ionic complex is 0.01 to 100 equivalents.

In the copolymerization, the relation between the in-solution concentration [B] of the cyclic olefin and the in-solution concentration [A] of ethylene is preferably $$0.30 \leq [B]/([A]+[B]) \leq 0.99$$

and more preferably $$0.50 \leq [B]/([A]+[B]) \leq 0.98$$

The cyclic olefin copolymer obtained by the present process contains recurring units derived from ethylene, in an amount of generally 5 to 95 mole %, preferably 10 to 90 mole %, more preferably 30 to 90 mole %. The copolymer further contains recurring units derived from the at least one cyclic olefin represented by formula [I], [II] and [III], in an amount of generally 95–5 mole %, preferably 90–10 mole %, more preferably 70–10 mole %. The copolymer furthermore contains recurring units derived from the α-olefin (D) of 3 to 20 carbon atoms in an amount of preferably more than 0 to 7 mole %, more preferably more than 0 to 6 mole %.

The cyclic olefin copolymer of the present invention has an intrinsic viscosity [η], as measured at 135° C. in DECALIN (decahydronapthalene), of preferably 0.05 to 1.5 dl/g, more preferably 0.15 to 1.2 dl/g.

The present cyclic olefin copolymer has a glass transition temperature (Tg), as measured by DSC, of preferably 0° to 250° C., more preferably 70° to 250° C.

The present cyclic olefin copolymer has an iodine value of preferably 1.5 g-$I_2$/100 g polymer.

As described above, according to the process of the present invention, a cyclic olefin copolymer can be economically advantageously produced at a high catalytic activity and its molecular weight can be controlled in a wide range. The copolymer produced by this process retains excellent properties inherent to the cyclic olefin copolymer.

The present invention is hereinafter described in more detail by way of Examples. However, the present invention is not restricted to these Examples.

Various properties were measured as follows. (1) Intrinsic viscosity ([η])

Measured in a decalin solution (1 g/liter) at 135° C. using an Ubbelohde's viscometer.

(2) Glass transition temperature (Tg)

Measured in a nitrogen atmosphere at a temperature elevation rate of 10° C./min using DSC-220C manufactured by Seiko Denshi KK.

(3) Monomers ratio in polymer

Measured with $^{13}$C-NMR.

(4) Iodine value

Measured using iodine monochloride in accordance with JIS K 3331.

EXAMPLE 1

<Preliminary activation of catalyst>

In a glass-made reactor which was thoroughly purged with nitrogen, was placed 10.0 mg of isopropylidene(cyclopentadienyl)(fluorenyl)zirconium dichloride. Thereto was added 4.66 ml of a solution of methylalumoxane (hereinafter referred to as MAO) in toluene so that the aluminum atom added became 9.25 mM (millimole). To the mixture was applied an ultrasonic wave at 23° C. for 15 minutes. The resulting mixture was diluted with 41.94 ml of cyclohexane to obtain a catalyst solution.

<Batch polymerization under atmospheric pressure>

A copolymerization reaction of ethylene and bicyclo[2.2.1]-2-heptene (hereinafter abbreviated as NB) was conducted in a 500-ml glass reactor equipped with a stirrer according to the following procedure.

Into a glass reactor which was thoroughly dried and purged with nitrogen, were placed (1) cyclohexane and a solution of NB in cyclohexane so that the NB concentration in reactor became 70 g/liter and (2) a solution of triisobutylaluminum (TIBA) in cyclohexane so that the TIBA concentration in reactor became 1.0 mM/liter. Nitrogen bubbling was conducted for 10 minutes under stirring. Then, the system temperature was increased to 70° C. Thereafter, ethylene, nitrogen and propylene were fed at rates of 50.0 l/hr, 9.5 l/hr and 0.5 l/hr, respectively, via respective bubbling tubes. Thus, in this copolymerization system, the amount ratio of propylene (component [D]) and ethylene fed was 0.01. 15 Minutes later, there was added, as a catalyst, 2.52 ml of a solution of isopropylidene(cyclopentadienyl)(fluorenyl)zirconium dichloride and MAO in toluene so that the zirconium and MAO concentrations in reactor became 0.005 mM/l and 2.0 mM/l, respectively, whereby a polymerization reaction was initiated. 60 Minutes later, a toluene/isopropyl alcohol (1:1) mixture was added to the polymerization mixture to terminate the polymerization reaction.

The resulting mixture was brought into contact with an aqueous solution (consisting of 1 liter of water and 5 ml of concentrated hydrochloric acid) at a 1:1 ratio with vigorous stirring by the use of a homomixer to transfer the catalyst residue into an aqueous phase. The system was allowed to stand. The aqueous phase was separated to remove. The polymer phase was washed with distilled water twice to obtain a purified polymer solution.

The purified polymer solution was brought into contact with acetone of three times the amount of said solution with vigorous stirring, to precipitate a copolymer. The solid portion was collected by filtration and thoroughly washed with acetone. Then, in order to remove, by extraction, the unreacted NB present in the solid portion, the solid portion was poured into acetone in a concentration of 40 g/l and the extraction was conducted at 60° C. for 2 hours. After the extraction, the solid portion was collected by filtration and dried at 130° C. for 12 hours at 350 mmHg in a nitrogen current.

The yield of the thus-obtained ethylene-NB copolymer was 5.71 g; the polymer concentration was 22.8 g/l; and the catalytic activity was 4,570 g/mM Zr. The copolymer had an [η] of 0.69 dl/g, a Tg of 167° C., an NB content of 56.3 mole %, a propylene content of 0.1 mole % and an iodine value of 0.4 g-$I_2$/100 g polymer. The results are shown in Table 1.

EXAMPLE 2

Copolymerization was conducted in the same manner as in Example 1 except that ethylene, nitrogen and propylene were fed at rates of 50.0 l/g, 9.25 l/g and 0.75 l/g, respectively. The results are shown in Table 1.

EXAMPLE 3

Copolymerization was conducted in the same manner as in Example 1 except that ethylene, nitrogen and propylene were fed at rates of 50.0 l/g, 9.0 l/g and 1.0 l/g, respectively. The results are shown in Table 1.

COMPARATIVE EXAMPLE 1

Copolymerization was conducted in the same manner as in Example 1 except that ethylene and nitrogen were fed at rates of 50.0 l/g and 10.0 l/g, respectively, and no propylene was fed. The results are shown in Table 1.

COMPARATIVE EXAMPLE 2

Copolymerization was conducted in the same manner as in Example 1 except that ethylene and nitrogen were fed at rates of 50.0 l/g and 9.5 l/g, respectively, and hydrogen was fed at a rate of 0.5 l/g. The results are shown in Table 1. The catalytic activity was lower than the case when propylene was added.

COMPARATIVE EXAMPLE 3

Copolymerization was conducted in the same manner as in Example 1 except that ethylene and nitrogen were fed at rates of 50.0 l/g and 9.0 respectively, and hydrogen was fed at a rate of 1.0 l/g. The results are shown in Table 1. The catalytic activity was lower than the case where propylene was added.

TABLE 1

| | Ethylene (l/hr) | Nitrogen (l/hr) | Propylene (l/hr) | Hydrogen (l/hr) | Propylene/ ethylene (molar ratio) | Yield (g) | Catalytic activity (g/mM Zr) | Tg (°C.) | [η] (dl/g) | Propylene content (mole %) | Iodine value (g-$I_2$/ 100 g polymer) |
|---|---|---|---|---|---|---|---|---|---|---|---|
| Ex. 1 | 50 | 9.5 | 0.5 | 0 | 0.01 | 5.71 | 4570 | 167 | 0.69 | 0.13 | 0.4 |
| Ex. 2 | 50 | 9.25 | 0.75 | 0 | 0.015 | 5.90 | 4720 | 170 | 0.53 | 0.15 | 0.7 |
| Ex. 3 | 50 | 9.0 | 1.0 | 0 | 0.02 | 6.32 | 5060 | 172 | 0.43 | 0.18 | 0.9 |
| Comp. Ex. 1 | 50 | 10.0 | 0 | 0 | 0 | 5.87 | 4700 | 171 | 1.66 | — | 0.3 |
| Comp. Ex. 2 | 50 | 9.5 | 0 | 0.5 | 0 | 2.90 | 2320 | 171 | 0.53 | — | 0.3 |
| Comp. Ex. 3 | 50 | 9.0 | 0 | 1.0 | 0 | 2.31 | 1850 | 171 | 0.31 | — | 0.3 |

Copolymerzation conditions
Polymerization scale: 250 ml, NB: 70 g/l
Metallocene: isopropylidene (cyclopentadienyl) (fluorenyl) zirconium dichloride, Zr: 0.005 mM/l, MAO = 2.0 mM/l, TIBA = 1.0 mM/l, 70° C., 60 min., in cyclohexane

EXAMPLE 4

<Preliminary activation of catalyst>

In a glass reactor which was thoroughly purged with nitrogen, was placed 10.0 mg of isopropylidene(cyclopentadienyl)(fluorenyl)zirconium dichloride. Thereto was added 4.67 ml of a solution of MAO in toluene so that the aluminum atom added became 9.25 mM. To the mixture was applied an ultrasonic wave at 23° C. for 15 minutes. The resulting mixture was diluted with 42.1 ml of cyclohexane to obtain a catalyst solution.

<Batch polymerization under elevated pressure>

In a 1.5-liter autoclave which was vacuum-dried and purged with nitrogen, were placed, at room temperature, 105 g of norbornene, 170.2 ml of cyclohexane and 0.3 ml of a cyclohexane solution containing 1.0 mM/ml of triisobutylaluminum. Thereto was added ethylene with stirring so that the total pressure became 4 kg/cm² G, followed by pressure release. This pressurization and pressure release was repeated three times. After it was confirmed that the pressure became normal pressure, 790 ml of propylene was fed into the autoclave. Ethylene was fed into the autoclave via an integrating flow meter so that the total pressure became 1.5 kg/cm² G. The temperature inside the autoclave was increased to 70° C., after which ethylene was added so that the autoclave inside pressure became 4 kg/cm². Stirring was conducted for 15 minutes, and 3.03 ml of the previously-prepared cyclohexane solution containing isopropylidene-(cyclopentadienyl)(fluorenyl)zirconium dichloride and MAO was added to initiate a copolymerization reaction of ethylene and NB. At this time, the catalyst concentration was 0.005 mM/l [isopropylidene(cyclopentadienyl)(fluorenyl)zirconium dichloride] and 2.0 mM/l (MAO). During the copolymerization, the autoclave inside pressure was kept at 4 kg/cm$^2$ by feeding ethylene continuously. 60 Minutes later, isopropyl alcohol was added to terminate the copolymerization. The volume of ethylene fed from the start of pressurization to the termination of polymerization was 16,800 ml at 25° C. Thus, in the copolymerization, the amount ratio of propylene (component [D]) and ethylene fed was 0.0470. After pressure release, the polymerization mixture was taken out of the autoclave and brought into contact with an aqueous solution (consisting of 1 liter of water and 5 ml of concentrated hydrochloric acid) at a 1:1 ratio with vigorous stirring using a homomixer, to transfer the catalyst residue into the aqueous phase. The resulting mixture was allowed to stand. The aqueous phase was separated to remove and the polymer phase was washed with distilled water twice to obtain a purified polymer solution.

The purified polymer solution was brought into contact with acetone of three times the amount of said solution with vigorous stirring, to precipitate a copolymer. The solid portion (copolymer) was collected by filtration and thoroughly washed with acetone. Then, in order to remove, by extraction, the unreacted NB present in the solid portion, the solid portion was poured into acetone in a concentration of 40 g/l and the extraction was conducted at 60° C for 2 hours.

catalytic activity was lower than the case where propylene was added.

COMPARATIVE EXAMPLE 5

Copolymerization was conducted in the same manner as in Example 4 except that no propylene was fed. The results are shown in Table 2.

EXAMPLE 5

Copolymerization was conducted in the same manner as in Example 4 except that propylene was fed in an amount of 395 ml. The results are shown in Table 2.

COMPARATIVE EXAMPLE 6

Copolymerization was conducted in the same manner as in Example 4 except that propylene was fed in an amount of 7 ml. The results are shown in Table 2. There was substantially no effect on molecular weight control.

TABLE 2

| | Hydrogen (ml) | Propylene (ml) | Total ethylene fed (ml) | Propylene/ethylene (molar ratio) | Yield (g) | Catalytic activity (g/mM Zr) | Tg (°C.) | [η] (dl/g) | Propylene content (mole %) | Iodine value (g-I$_2$/100 g polymer) |
|---|---|---|---|---|---|---|---|---|---|---|
| Ex. 4 | 0 | 790 | 16800 | 0.0471 | 45.0 | 30000 | 143 | 0.68 | 0.21 | 0.7 |
| Comp. Ex. 4 | 250 | 0 | 10800 | 0 | 15.3 | 10200 | 144 | 0.63 | — | 0.3 |
| Comp. Ex. 5 | 0 | 0 | 16000 | 0 | 41.1 | 27400 | 144 | 1.54 | — | 0.3 |
| Ex. 5 | 0 | 395 | 15200 | 0.0259 | 37.4 | 24900 | 140 | 0.94 | 0.14 | 0.4 |
| Comp. Ex. 6 | 0 | 7 | 16400 | 0.000437 | 43.1 | 28700 | 144 | 1.51 | Not detected | 0.3 |

Copolymerzation conditions
Reactor: 1.5 l, polymerization scale: 300 ml, ethylene: 4 kg/cm$^2$G (total pressure), NB: 105 g
Metallocene: isopropylidene (cyclopentadienyl) (fluorenyl) zirconium dichloride, Zr: 0.005 mM/l, MAO = 2.0 mM/l, TIBA = 1.0 mM/l, 70° C., 60 min., in cyclohexane After the extraction, the solid portion was collected by filtration and dried at 130° C. for 12 hours at 350 mmHg in a nitrogen current.

The yield of the thus-obtained ethylene-NB copolymer was 45.0 g. The copolymer had an [η] of 0.68 dl/g, a Tg of 143° C., an NB content of 49.5 mole %, a propylene content of 0.2 mole % and an iodine value of 0.7 g-I$_2$/100 g polymer. The results are shown in Table 2.

COMPARATIVE EXAMPLE 4

Copolymerization was conducted in the same manner as in Example 4 except that 250 ml of hydrogen was fed in place of propylene. The results are shown in Table 2. The

EXAMPLE 6

Copolymerization was conducted in the same manner as in Example 4 except that the amount of NB fed was 30 g, the amount of propylene was 780 ml, the ethylene pressure was 4 kg/cm$^2$ G (total pressure), the metallocene (catalyst) concentration was 0.003 mM/l in terms of Zr, the MAO concentration was 1.2 mM/l and the TIBA concentration was 4.0 mM/l. The results are shown in Table 3.

COMPARATIVE EXAMPLE 7

Copolymerization was conducted in the same manner as in Example 6 except that no propylene was fed. The results are shown in Table 3.

TABLE 3

| | Hydrogen (ml) | Propylene (ml) | Total ethylene fed (ml) | Propylene/ ethylene (molar ratio) | Yield (g) | Catalytic activity (g/mM Zr) | Tg (°C.) | [η] (dl/g) | Propylene content (mole %) | Iodine value (g-I$_2$/ 100 g polymer) |
|---|---|---|---|---|---|---|---|---|---|---|
| Ex. 6 | 0 | 780 | 18600 | 0.042 | 35.8 | 39800 | 74 | 0.53 | 2.9 | 0.8 |
| Comp. Ex. 7 | 0 | 0 | 16500 | 0 | 30.0 | 33300 | 81 | 1.15 | 0 | 0.3 |

Copolymerization conditions
Reactor: 1.5 l, polymerization scale: 300 ml, ethylene: 4 kg/cm$^2$G (total pressure), NB: 30 g
Metallocene: isopropylidene (cyclopentadienyl) (fluorenyl) zirconium dichloride, Zr: 0.003 mM/l, MAO = 1.2 mM/l, TIBA = 4.0 mM/l, 70° C. 60 min., in cyclohexane

EXAMPLES 7–8 AND COMPARATIVE EXAMPLES 8–9

Copolymerization was conducted in the same manner as in Example 4 except that 15.4 g of tetracyclo[4.4.0.1$^{2,5}$.1$^{7,10}$]-3-dodecene (hereinafter abbreviated as TCD) was used in place of NB, the metallocene concentration was 0.004 mM/l in terms of Zr, the MAO concentration was 1.6 mM/l, the TIBA concentration was 4.0 mM/l, the polymerization time was 5 minutes, ethylene was fed so that the inside pressure was kept at 3 kg/cm$^2$ G, and propylene was fed as shown in Table 4. Also in these Examples and Comparative Examples, it was found that the introduction of propylene enabled to control molecular weight with the catalytic activity being maintained. The results are shown in Table 4.

TABLE 4

| | Hydrogen (ml) | Propylene (ml) | Total ethylene fed (ml) | Propylene/ ethylene (molar ratio) | Yield (g) | Catalytic activity (g/mM Zr) | Tg (°C.) | [η] (dl/g) | Propylene content (mole %) | Iodine value (g-I$_2$/ 100 g polymer) |
|---|---|---|---|---|---|---|---|---|---|---|
| Ex. 7 | 0 | 690 | 8600 | 0.080 | 7.5 | 5010 | 76 | 0.64 | 3.4 | 0.5 |
| Ex. 8 | 0 | 1030 | 8900 | 0.12 | 8.8 | 5850 | 72 | 0.56 | 5.6 | 0.7 |
| Comp. Ex. 8 | 0 | 0 | 8700 | 0 | 8.4 | 5600 | 81 | 0.89 | 0 | 0.3 |
| Comp. Ex. 9 | 0 | 2630 | 8500 | 0.31 | 7.2 | 4800 | 58 | 0.03 | 9.3 | 1.1 |

Copolymerization conditions
Reactor: 1.5 l, polymerization scale: 375 ml, ethylene: 3 kg/cm$^2$G (total pressure), TCD: 15.4 g
Metallocene: isopropylidene (cyclopentadienyl) (fluorenyl) zirconium dichloride, Zr: 0.004 mM/l, MAO = 1.6 mM/l, TIBA = 4.0 mM/l, 70° C., 5 min., in cyclohexane

EXAMPLES 9–10 AND COMPARATIVE EXAMPLE 10

Copolymerization was conducted in the same manner as in Example 7 except that the amount of TCD fed was 37.5 g, the metallocene concentration was 0.005 mM/l in terms of Zr, the MAO concentration was 2.0 mM/l, and the polymerization time was 20 minutes (Example 9) and 10 minutes (Example 10 and Comparative Example 10). The results are shown in Table 5.

TABLE 5

| | Hydrogen (ml) | Propylene (ml) | Total ethylene fed (ml) | Propylene/ ethylene (molar ratio) | Yield (g) | Catalytic activity (g/mM Zr) | Tg (°C.) | [η] (dl/g) | Propylene content (mole %) | Iodine value (g-I$_2$/ 100 g polymer) |
|---|---|---|---|---|---|---|---|---|---|---|
| Ex. 9 | 0 | 690 | 10000 | 0.0690 | 17.0 | 9040 | 130 | 0.57 | 3.1 | 0.6 |

TABLE 5-continued

|  | Hydrogen (ml) | Propylene (ml) | Total ethylene fed (ml) | Propylene/ ethylene (molar ratio) | Yield (g) | Catalytic activity (g/mM Zr) | Tg (°C.) | [η] (dl/g) | Propylene content (mole %) | Iodine value (g-I$_2$/ 100 g polymer) |
|---|---|---|---|---|---|---|---|---|---|---|
| Ex.10 | 0 | 1030 | 9000 | 0.114 | 14.3 | 7610 | 132 | 0.50 | 4.4 | 0.6 |
| Comp. Ex. 10 | 0 | 0 | 9400 | 0 | 14.9 | 7950 | 130 | 0.89 | 0 | 0.3 |

Copolymerzation conditions
Reactor: 1.5 l, polymerization scale: 375 ml, ethylene: 3 kg/cm$^2$G (total pressure), TCD: 37.5 g
Metallocene: isopropylidene (cyclopentadienyl) (fluorenyl) zirconium dichloride, Zr: 0.005 mM/l, MAO = 2.0 mM/l, TIBA = 4.0 mM/l, 70° C., in cyclohexane

EXAMPLE 11

<Preliminary activation of catalyst>

In a glass reactor which was thoroughly purged with nitrogen, was placed 10.0 mg of isopropylidene(cyclopentadienyl)(indenyl)zirconium dichloride. Thereto was added 5.28 ml of a solution of MAO in toluene so that the aluminum atom added became 10.45 mM. To the mixture was applied an ultrasonic wave at 23° C. for 15 minutes. The resulting mixture was diluted with 47.6 ml of cyclohexane to obtain a catalyst solution.

<Batch polymerization under elevated pressure>

In a 1.5-liter autoclave which was vacuum-dried and purged with nitrogen, were placed, at room temperature, 105 g of NB, 164.1 ml of cyclohexane and 0.3 ml of a cyclohexane solution containing 1.0 mM/ml of triisobutylaluminum. Thereto was added ethylene with stirring so that the total pressure became 6 kg/cm$^2$ G, followed by pressure release. This pressurization and pressure release was repeated three times. After it was confirmed that the pressure became normal pressure, 660 ml of propylene was fed into the autoclave. Ethylene was fed into the autoclave via an integrating flow meter so that the total pressure became 1.5 kg/cm$^2$ G. The temperature inside the autoclave was increased to 70° C., after which ethylene was added so that the autoclave inside pressure became 6 kg/cm$^2$. Stirring was conducted for 15 minutes, and 9.10 ml of the previously-prepared cyclohexane solution containing isopropylidene(cyclopentadienyl)(indenyl)zirconium dichloride and MAO was added to initiate a copolymerization reaction of ethylene and NB. At this time, the catalyst concentration was 0.015 mM/l [isopropylidene(cyclopentadienyl)(indenyl)zirconium dichloride] and 6.0 mM/l (MAO). During the copolymerization, the autoclave inside pressure was kept at 6 kg/cm$^2$ by feeding ethylene continuously. Thus was synthesized a copolymer. The volume of ethylene fed from the start of pressurization to the termination of polymerization was 13,300 ml at 25° C. Thus, in the copolymerization, the amount ratio of propylene (component [D]) and ethylene fed was 0.0496.

The yield of the thus-obtained ethylene-NB copolymer was 15.5 g, and the catalytic activity was 3,400 g/mM. Zr. The copolymer had an [η] of 0.45 dl/g, a Tg of 147° C., an NB content of 56.0 mole %, a propylene content of 0.1 mole % and an iodine value of 0.6 g-I$_2$/100 g polymer.

EXAMPLE 12

<Preliminary activation of catalyst>

In a glass reactor which was thoroughly purged with nitrogen, was placed 10.0 mg of ethylenebis(indenyl)zirconium dichloride. Thereto was added 6.04 ml of a solution of MAO in toluene so that the aluminum atom added became 11.94 mM. To the mixture was applied an ultrasonic wave at 23° C. for 15 minutes to obtain a catalyst solution.

<Batch polymerization under atmospheric pressure>

A copolymerization reaction of ethylene and NB was conducted in a 500-ml glass reactor equipped with a stirrer according to the following procedure.

Into a glass reactor which was thoroughly dried and purged with nitrogen, were placed a toluene solution of NB, a toluene solution of TIBA and toluene. They were added in such amounts that the NB concentration in reactor became 110 g/l, the TIBA concentration in reactor became 1.0 mM/l, and the total liquid volume in reactor became 249.05 ml. Nitrogen bubbling was conducted for 10 minutes under stirring. Then, the system temperature was increased to 70° C. Thereafter, ethylene, nitrogen and propylene were fed at rates of 50.0 l/hr, 9.5 l/hr and 0.5l/hr, respectively, via respective bubbling tubes. Thus, in this copolymerization system, the amount ratio of propylene (component [D]) and ethylene fed was 0.01. 15 Minutes later, there was added, as a catalyst, 0.93 ml of a solution of ethylenebis(indenyl)zirconium dichloride and MAO in toluene so that the zirconium and MAO concentrations in reactor became 0.015 mM/l and 7.5 mM/l, respectively, whereby a polymerization reaction was initiated. 60 Minutes later, a toluene/isopropyl alcohol (1:1) mixture was added to the polymerization mixture to terminate the polymerization reaction.

The resulting mixture was brought into contact with an aqueous solution (consisting of 1 liter of water and 5 ml of concentrated hydrochloric acid) at a 1:1 ratio with vigorous stirring by the use of a homomixer to transfer the catalyst residue into an aqueous phase. The system was allowed to stand. The aqueous phase was separated to remove. The polymer phase was washed with distilled water twice to obtain a purified polymer solution.

The purified polymer solution was brought into contact with acetone of three times the amount of said solution with vigorous stirring, to precipitate a copolymer. The solid portion was collected by filtration and thoroughly washed with acetone. Then, in order to remove, by extraction, the unreacted NB present in the solid portion, the solid portion was poured into acetone in a concentration of 40 g/l and the extraction was conducted at 60° C. for 2 hours. After the extraction, the solid portion was collected by filtration and dried at 130° C. for 12 hours at 350 mmHg in a nitrogen current.

The yield of the thus-obtained ethylene-NB copolymer was 10.8 g; the polymer concentration was 43.2 g/l; and the catalytic activity was 2,880 g/mM Zr. The copolymer had an [η] of 0.65 dl/g, a Tg of 175° C., an NB content of 53.2 mole %, a propylene content of 0.2 mole % and an iodine value of 0.6 g-I$_2$/100 g polymer. The results are shown in Table 6.

COMPARATIVE EXAMPLE 11

Copolymerization was conducted in the same manner as in Example 12 except that 0.5 l/hr of hydrogen was fed in place of propylene. The results are shown in Table 6.

COMPARATIVE EXAMPLE 12

Copolymerization was conducted in the same manner as in Example 12 except that no propylene was fed. The results are shown in Table 6.

(propylene) and ethylene fed was 0.02. A copolymerization reaction was conducted with the copolymerization temperature kept at 70° C. by circulating a heat transfer medium through a jacket provided outside the reactor. The solution containing a cyclic olefin copolymer formed in the copolymerization reaction was continuously taken out from the reactor top so that the amount of the solution in the reactor was kept at 1 liter (that is, the average residence time became 0.5 hour). To the taken-out solution was added a cyclohexane-isopropyl alcohol (1:1) mixture to terminate the copo-

TABLE 6

|  | Ethylene (l/hr) | Nitrogen (l/hr) | Propylene (l/hr) | Hydrogen (l/hr) | Propylene/ ethylene (molar ratio) | Yield (g) | Catalytic activity (g/mM Zr) | Tg (°C.) | [η] (dl/g) | Propylene content (mole %) | Iodine value (g-$I_2$/ 100 g polymer) |
|---|---|---|---|---|---|---|---|---|---|---|---|
| Ex. 12 | 50 | 9.5 | 0.5 | 0 | 0.01 | 10.8 | 2880 | 175 | 0.65 | 0.20 | 0.6 |
| Comp. Ex. 11 | 50 | 9.5 | 0 | 0.5 | 0 | 10.1 | 2690 | 167 | 0.18 | — | 0.2 |
| Comp. Ex. 12 | 50 | 9.0 | 0 | 0 | 0 | 11.4 | 3040 | 177 | 1.25 | — | 0.2 |

Copolymerzation conditions
Polymerization scale: 250 ml, NB: 110 g/l
Metallocene: ethylenebis (imdenyl) zirconium dichloride, Zr: 0.015 mM/l, MAO = 7.5 mM/l, TIBA = 1.0 mM/l, 70° C., 60 min., in toluene

EXAMPLE 13

Copolymerization was conducted in the same manner as in Example 4 except that 250 ml of 1-butene was fed in place of propylene. In the copolymerization, ethylene was fed in an amount of 16,200 ml at 25° C. Thus, the amount ratio of component [D] (1-butene) and ethylene fed was 0.0154. The yield of thus obtained ethylene-NB copolymer was 42.1 g, and the catalytic activity was 28,100 g/mM Zr. The copolymer had an [η] of 0.74 dl/g, a Tg of 142° C., an NB content of 48.8 mole %, a 1-butene content of 0.2 mole and an iodine value of 0.6 g-$I_2$/100 g polymer.

EXAMPLE 14

<Preliminary activation of catalyst>

In a glass reactor which was thoroughly purged with nitrogen, was placed 20.0 mg of isopropylidene(cyclopentadienyl)(fluorenyl)zirconium dichloride. Thereto was added 9.34 ml of a solution of MAO in toluene so that the aluminum atom added became 18.5 mM. To the mixture was applied an ultrasonic wave at 23° C. for 15 minutes. The resulting mixture was diluted with 737.9 ml of cyclohexane to obtain a catalyst solution.

<Continuous polymerization of ethylene and NB under atmospheric pressure>

A copolymerization reaction of ethylene and NB was conducted in a 1-liter glass reactor equipped with a stirrer according to the following procedure.

A solution of NB in cyclohexane was continuously fed into a reactor from the top so that the NB concentration in reactor became 80 g/l. Into the reactor from the top were also fed continuously, as a catalyst, the previously-prepared catalyst solution [the solution of isopropylidene(cyclopentadienyl)(fluorenyl)zirconium dichloride and MAO] and a solution of TIBA in cyclohexane so that the concentrations of zirconium, MAO and TIBA in reactor became 0.005 mM/l, 2.0 mM/l and 1.0 mM/l, respectively. Into the reactor were also fed 60.0 l/hr of ethylene, 10.8 l/hr of nitrogen and 1.2 l/hr of propylene via respective bubbling tubes. Thus, in this copolymerization, the amount ratio of component [D]

lymerization reaction. The resulting mixture was brought into contact with an aqueous solution (consisting of 1 liter of water and 5 ml of concentrated hydrochloric acid) at a 1:1 ratio with vigorous stirring by the use of a homomixer to transfer the catalyst residue into an aqueous phase. The system was allowed to stand. The aqueous phase was separated to remove. The polymer phase was washed with distilled water twice to obtain a purified polymer solution.

The purified polymer solution was brought into contact with acetone of three times the amount of said solution with vigorous stirring, to precipitate a copolymer. The solid portion was collected by filtration and thoroughly washed with acetone. Then, in order to remove, by extraction, the unreacted NB present in the solid portion, the solid portion was poured into acetone in a concentration of 40 g/l and the extraction was conducted at 60° C. for 2 hours. After the extraction, the solid portion was collected by filtration and dried at 130° C. for 12 hours at 350 mmHg in a nitrogen current.

The thus-obtained ethylene-NB copolymer had an [η] of 0.65 dl/g, a Tg of 165° C., an NB content of 54.9 mole % and an iodine value of 0.8 g-$I_2$/100 g copolymer.

EXAMPLE 15

<Preliminary activation of catalyst>

In a glass reactor which was thoroughly purged with nitrogen, was placed 10.0 mg of isopropylidene(cyclopentadienyl)(fluorenyl)zirconium dichloride. Thereto was added 4.66 ml of a solution of MAO in toluene so that the aluminum atom added became 9.25 mM. To the mixture was applied an ultrasonic wave at 23° C. for 15 minutes. The resulting mixture was diluted with 41.94 ml of cyclohexane to obtain a catalyst solution.

<Batch polymerization under atmospheric pressure>

A copolymerization reaction of ethylene and NB was conducted in a 500-ml glass reactor equipped with a stirrer according to the following procedure.

Into a glass reactor which was thoroughly dried and purged with nitrogen, were placed cyclohexane and a solution of NB in cyclohexane so that the NB concentration in reactor became 70 g/l. There was also placed, as a component [D], 0.52 g of 1-decene so that the initial 1-decene concentration in reactor became 0.146 M/l. There was also placed a solution of TIBA in cyclohexane so that the TIBA concentration in reactor became 1.0 mM/l. Nitrogen bubbling was conducted for 10 minutes under stirring. Then, the system temperature was increased to 70° C. Thereafter, ethylene and nitrogen were fed at rates of 50.0 l/hr and 10.0 l/hr, respectively, via respective bubbling tubes.

15 Minutes later, there was added, as a catalyst, 2.52 ml of a solution of isopropylidene(cyclopentadienyl)(fluorenyl)zirconium dichloride and MAO in toluene so that the zirconium and MAO concentrations in reactor became 0.005 mM/l and 2.0 mM/l, respectively, whereby a polymerization reaction was initiated. 60 Minutes later, a toluene/isopropyl alcohol (1:1) mixture was added to the polymerization mixture to terminate the polymerization reaction.

Thus, in this copolymerization, the amount ratio of 1-decene (component [D]) and ethylene fed was 0.000893.

The resulting mixture was brought into contact with an aqueous solution (consisting of 1 liter of water and 5 ml of concentrated hydrochloric acid) at a 1:1 ratio with vigorous stirring by the use of a homomixer to transfer the catalyst residue into an aqueous phase. The system was allowed to stand. The aqueous phase was separated to remove. The polymer phase was washed with distilled water twice to obtain a purified polymer solution.

The purified polymer solution was brought into contact with acetone of three times the amount of said solution with vigorous stirring, to precipitate a copolymer. The solid portion was collected by filtration and thoroughly washed with acetone. Then, in order to remove, by extraction, the unreacted NB present in the solid portion, the solid portion was poured into acetone in a concentration of 40 g/l and the extraction was conducted at 60° C. for 2 hours. After the extraction, the solid portion was collected by filtration and dried at 130° C. for 12 hours at 350 mmHg in a nitrogen current.

The yield of the thus-obtained ethylene-NB copolymer was 5.38 g; the polymer concentration was 21.5 g/l; and the catalytic activity was 4,300 g/mM Zr. The copolymer had an [η] of 0.67 dl/g, a Tg of 155° C., an NB content of 51.7 mole %, a 1-decene content of 0.7 mole % and an iodine value of 0.9 g-$I_2$/100 g polymer.

EXAMPLE 16 AND COMPARATIVE EXAMPLES 13–14

Copolymerization was conducted in the same manner as in Example 4 except that hexacyclo[6.6.1.1$^{3,6}$.1$^{10,13}$.0$^{2,7}$.0$^{9,14}$]-4-heptadecene (hereinafter abbreviated as HHD) was used in place of NB and the conditions shown in Table 7 were employed. Also in Example 16 and Comparative Examples 13–14, was found that the introduction of propylene enabled to control molecular weight with the catalytic activity being maintained.

TABLE 7

|  | Hydrogen (ml) | Propylene (ml) | Total ethylene fed (ml) | Propylene/ethylene (molar ratio) | Yield (g) | Catalytic activity (g/mM Zr) | Tg (°C.) | [η] (dl/g) | Propylene content (mole %) | Iodine value (g-$I_2$/100 g polymer) |
|---|---|---|---|---|---|---|---|---|---|---|
| Ex. 16 | 0 | 1030 | 7660 | 0.134 | 4.8 | 4000 | 78 | 0.52 | 5.5 | 0.6 |
| Comp. Ex. 13 | 0 | 2630 | 7490 | 0.351 | 3.2 | 2670 | 59 | 0.03 | 10.2 | 1.3 |
| Comp. Ex. 14 | 0 | 0 | 7630 | 0 | 4.7 | 3920 | 59 | 0.70 | 0 | 0.3 |

Copolymerzation conditions
Reactor: 1.5 l, polymerization scale: 300 ml, ethylene: 3 kg/cm$^2$G (total pressure), HHD: 10.0 g
Metallocene: isopropylidene (cyclopentadienyl) (fluorenyl) zirconium dichloride, Zr: 0.004 mM/l, MAO = 1.6 mM/l, TIBA = 4.0 mM/l, 70° C., 5 min., in cyclohexane

EXAMPLE 17

<Preliminary activation of catalyst>

In a glass reactor which was thoroughly purged with nitrogen, was placed 175.9 mg (0.407 mM) of isopropylidene(cyclopentadienyl)(fluorenyl)zirconium dichloride. Thereto was added 107.7 ml of a solution of MAO in toluene (the aluminum concentration in solution=1.51 mM/ml) so that the aluminum atom added became 162.7 mM. The mixture was stirred at 23° C. for 30 minutes. The resulting mixture was diluted with 10.66 liters of cyclohexane (50-fold dilution) to obtain a catalyst solution. The zirconium concentration in this catalyst solution was 0.0378 mM/l.

<Continuous copolymerization of ethylene and NB under elevated pressure>

Continuous copolymerization of ethylene and NB was conducted in a 5-liter stainless steel reactor provided with a stirrer.

Into a reactor from the top were continuously fed 0.96 l/hr of dehydrated and purified cyclohexane, 1.32 l/hr of a solution of NB in cyclohexane (norbornene concentration in solution=40 g/100 ml), 1.08 l/hr of the previously-prepared catalyst solution and 0.4 l/hr of a solution of triisobutylaluminum in cyclohexane (triisobutylaluminum concentration in solution=0.01 mM/ml).

Also from the reactor top were continuously fed 130 l/hr (5.35 mole/hr) of ethylene and 4.5 l/hr (0.185 mole/hr) of propylene. Thus, the molar ratio of ethylene and propylene fed was 0.0345. The polymerization temperature was kept at 70° C.

The polymerization pressure was 3.1 kg/cm$^2$ G, and the residence time was 1 hour and 20 minutes.

The polymerization mixture was taken out from the reactor bottom and mixed with a small amount of methanol to terminate the reaction. The pressure of the system was returned to normal pressure. The resulting mixture was mixed with the same volume of an aqueous sodium hydroxide solution and stirred vigorously for 5 minutes. The mixture was allowed to stand to separate an aqueous phase. The organic phase was washed with water twice by vigorous stirring and then subjected to steam stripping to precipitate a copolymer from the solvent. The copolymer was dried under reduced pressure at 130° C. for 12 hours.

By the above procedure was obtained an ethylene-NB copolymer at a rate of 362 g/hr. The copolymer had an ethylene content of 63.1 mole %, an NB content of 33.6 mole %, a propylene content of 3.3 mole %, a Tg of 79° C., an [η] of 0.78 dl/g and an iodine value of 0.5 g-$I_2$/100 g polymer.

What is claimed is:

1. A process for producing a cyclic olefin copolymer, which comprises copolymerizing (A) ethylene, and (B) at least one cyclic olefin selected from the group consisting of a compound represented by the following formula [I]

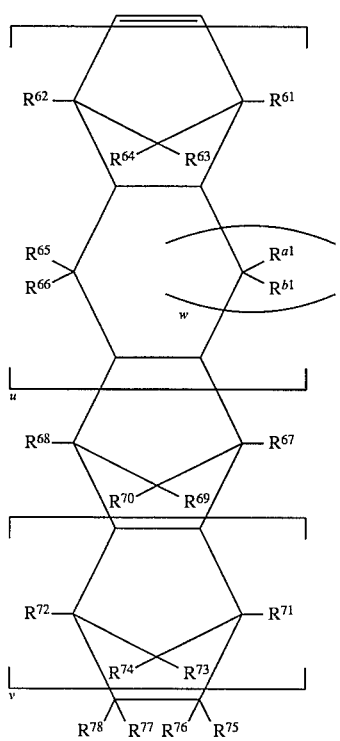

(wherein u is 0 or 1; v is 0 or a positive integer; w is 0 or 1; $R^{61}$ to $R^{78}$, $R^{a1}$ and $R^{b1}$ are independently selected from the group consisting of a hydrogen atom, a halogen atom and a hydrocarbon group; $R^{75}$ to $R^{78}$ may be bonded together to form a single ring or multiple rings; the single ring or the multiple rings may have a double bond; and $R^{75}$ and $R^{76}$, or $R^{77}$ and $R^{78}$ may form an alkylidene group), a compound represented by the following formula [II]

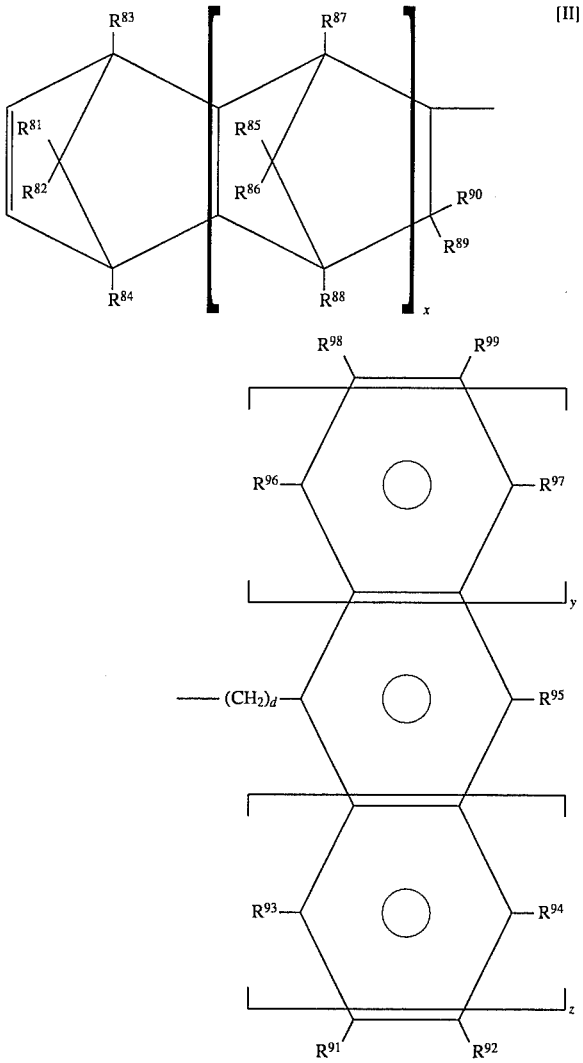

(wherein x and d are 0 or an integer of 1 or more; y and z are each 0, 1 or 2; $R^{81}$ to $R^{99}$ are independently selected from the group consisting of a hydrogen atom, a halogen atom, an aliphatic hydrocarbon group, an alicyclic hydrocarbon group, an aromatic hydrocarbon group and an alkoxy group; the carbon atom to which $R^{89}$ and $R^{90}$ are bonded and the carbon to which $R^{93}$ is bonded or the carbon atom to which $R^{91}$ is bonded may be bonded together directly or via an alkylene group having 1 to 3 carbon atoms; and $R^{95}$ and $R^{92}$, or $R^{95}$ and $R^{99}$ may be bonded together to form a single aromatic ring or multiple aromatic rings when y=z=0), and a compound represented by the following formula [III]

(wherein $R^{100}$ and $R^{101}$ are independently a hydrogen atom or a hydrocarbon group having 1 to 5 carbon atoms, and f is an integer of 1 to 18), in the presence of (C) a catalyst comprising ($C_1$) a transition metal compound represented by the following formula [IV]

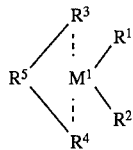

and ($C_2$) at least one member selected from the group consisting of an organic aluminum oxy compound, a compound capable of reacting with said transition metal compound ($C_1$) to form an ionic complex, and a combination of at least one of these two compounds with an organic aluminum compound, and in the presence of (D) an α-olefin having 3 to 20 carbon atoms, the α-olefin (D) having 3 to 20 carbon atoms being used in a molar ratio of α-olefin (D) to ethylene (A), of 0.0005 to 0.2.

2. The process set forth in claim 1, wherein the molar ratio of α-olefin (D) to ethylene (A) is 0.001 to 0.2.

3. The process set forth in claim 1, wherein the at least one cyclic olefin (B) is selected from bicyclo[2.2.1]-2-heptene and derivatives thereof, tetracyclo[4.4.0.1$^{2,5}$.1$^{7,10}$]-3-dodecene and derivatives thereof, and hexacyclo[6.6.1.1$^{3,6}$.1$^{10,13}$.0$^{2,7}$.0$^{9,14}$]-4-heptacedene and derivatives thereof, all belonging to the compounds represented by the formula [I].

4. The process set forth in claim 1, wherein the combination of $R^3$ and $R^4$ in the formula [IV] is either of (i) a combination of a cyclopentadienyl group or a substituted cyclopentadienyl group, and an indenyl group or a substituted indenyl group, (ii) a combination of a cyclopentadienyl group or a substituted cyclopentadienyl group, and a fluorenyl group or a substituted fluorenyl group, and (iii) a combination of an indenyl group or a substituted indenyl group, and an indenyl group or a substituted indenyl group, the substituted cyclopentadienyl, indenyl or fluorenyl group referring to a cyclopentadienyl, indenyl or fluorenyl group whose at least one hydrogen atom is substituted by at least one group selected from an alkyl group of 1 to 10 carbon atoms and an aryl group of 6 to 10 carbon atoms.

5. The process set forth in claim 1, wherein the catalyst component ($C_1$) is selected from the group consisting of isopropylidene(cyclopentadienylindenyl)zirconium, isopropylidene(cyclopentadienylfluorenyl)zirconium dichloride, and ethylenebis(indenyl)zirconium dichloride.

* * * * *

UNITED STATES PATENT AND TRADEMARK OFFICE
CERTIFICATE OF CORRECTION

PATENT NO. : 5,559,199
DATED : September 24, 1996
INVENTOR(S) : Abe et al.

It is certified that error appears in the above-identified patent and that said Letters Patent is hereby corrected as shown below:

independently a hydrogen atom, a halogen atom, an alkyl group having 1 to 10 carbon atoms, a fluoroalkyl group having 1 to 10 carbon atoms, a fluoroaryl group having 6 to 10 carbon atoms, an aryl group having 6 to 10 carbon atoms, an alkoxy group having 1 to 10 carbon atoms, an alkenyl group having 2 to 10 carbon atoms, an arylalkyl group having 7 to 40 carbon atoms, an alkylaryl group having 7 to 40 carbon atoms or an arylalkenyl group having 8 to 40 carbon atoms, or $R^6$ and $R^7$ may be bonded to each other to form a ring together with the atoms to which they bond, and $R^8$ and $R^9$ may also be bonded to each other to form a ring together with the atoms to which they bond, and $M^2$ is silicon, germanium or tin).--

Signed and Sealed this

Twenty-fourth Day of August, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,559,199
DATED : September 24, 1996
INVENTOR(S) : Abe et al.

It is certified that error appears in the above-identified patent and that said Letters Patent is hereby corrected as shown below:

Claim 1, Column 53, line 10, before "and" insert

--(wherein $M^1$ is titanium, zirconium, hafnium, vanadium, niobium or tantalum; $R^1$ and $R^2$ are independently selected from the group consisting of a hydrogen atom, a halogen atom, an alkyl group having 1 to 10 carbon atoms, an alkoxy group having 1 to 10 carbon atoms, an aryl group having 6 to 10 carbon atoms, an aryloxy group having 6 to 10 carbon atoms, an alkenyl group having 2 to 10 carbon atoms, an arylalkyl group having 7 to 40 carbon atoms, an alkylaryl group having 7 to 40 carbon atoms or an arylalkenyl group having 8 to 40 carbon atoms; $R^3$ and $R^4$ are independently a hydrocarbon group of a single ring or multiple rings, having a cyclopentadienyl skeleton capable of coordinating to the central metal $M^1$; and $R^5$ is

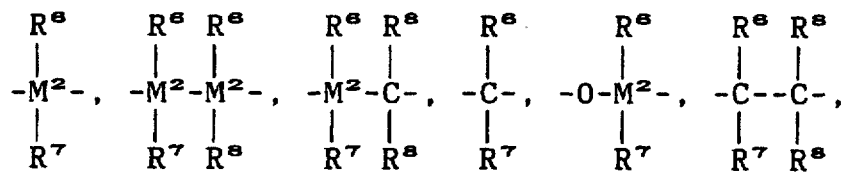

$=BR^6$, $=AlR^6$, $-Ge-$, $-Sn-$, $-O-$, $-S-$, $=SO$, $=SO_2$, $=NR^6$, $=CO$, $=PR^6$ or $=P(O)R^6$, wherein $R^6$, $R^7$ and $R^8$ are